US012064779B2

(12) United States Patent
Illemann et al.

(10) Patent No.: US 12,064,779 B2
(45) Date of Patent: Aug. 20, 2024

(54) LIQUID-DISPENSING SYSTEM, APPARATUS AND METHOD

(71) Applicant: Infineon Technologies AG, Neubiberg (DE)

(72) Inventors: Christian Illemann, Villach (AT); Karl Pilch, Villach (AT); Herbert Priess, Villach (AT)

(73) Assignee: Infineon Technologies AG, Neubiberg (DE)

( * ) Notice: Subject to any disclaimer, the term of this patent is extended or adjusted under 35 U.S.C. 154(b) by 643 days.

(21) Appl. No.: 17/107,060

(22) Filed: Nov. 30, 2020

(65) Prior Publication Data
US 2021/0078027 A1    Mar. 18, 2021

Related U.S. Application Data

(63) Continuation of application No. 15/666,928, filed on Aug. 2, 2017, now Pat. No. 10,906,057.

(30) Foreign Application Priority Data
Aug. 5, 2016 (DE) .......................... 102016114607.2

(51) Int. Cl.
*B05B 12/08*  (2006.01)
*B05B 12/00*  (2018.01)
*G01F 1/661* (2022.01)
*G01F 25/00* (2022.01)
*G01F 1/58*  (2006.01)
*G01F 1/66*  (2022.01)

(52) U.S. Cl.
CPC .......... *B05B 12/085* (2013.01); *B05B 12/008* (2013.01); *G01F 25/0092* (2013.01); *G01F 1/58* (2013.01); *G01F 1/66* (2013.01); *G01F 1/661* (2013.01)

(58) Field of Classification Search
CPC ..... B05B 12/085; B05B 12/008; G01F 1/661; G01F 1/66; G01F 1/662; G01F 1/58; B01L 3/0241; G01J 3/28; G01N 21/259
See application file for complete search history.

(56) References Cited

U.S. PATENT DOCUMENTS 5,559,339 A    9/1996    Domanik et al.
5,801,315 A    9/1998    Park et al.
(Continued)

FOREIGN PATENT DOCUMENTS

CN    101284639 A    10/2008
CN    101484782 A    7/2009
(Continued)

OTHER PUBLICATIONS

Spare Parts Catalogue, Serial No. 1560, Dec. 2011, 2 pages.
(Continued)

*Primary Examiner* — Tuongminh N Pham
(74) *Attorney, Agent, or Firm* — Slater Matsil, LLP

(57) ABSTRACT

A liquid-dispensing system includes at least one nozzle configured to dispense a liquid. The liquid-dispensing system includes at least one sensor module, configured to provide a sensor signal comprising information related to whether liquid is dispensed by the at least one nozzle. At least a part of the at least one sensor is located in proximity of the nozzle.

20 Claims, 15 Drawing Sheets

(56) References Cited

U.S. PATENT DOCUMENTS

| | | |
|---|---|---|
| 9,528,877 B2 | 12/2016 | Garbos et al. |
| 10,906,057 B2 * | 2/2021 | Illemann .............. B05B 12/085 |
| 2008/0028867 A1 | 2/2008 | Yamamoto |
| 2009/0000391 A1 | 1/2009 | Dorrmann et al. |
| 2010/0006667 A1 | 1/2010 | Nielsen et al. |
| 2010/0101493 A1 | 4/2010 | Hodge et al. |
| 2010/0118307 A1 | 5/2010 | Srinivasan et al. |
| 2010/0133292 A1 | 6/2010 | Ware et al. |
| 2011/0256724 A1 | 10/2011 | Chandrasekharan et al. |
| 2012/0314217 A1 | 12/2012 | Akimoto et al. |
| 2014/0130606 A1 | 5/2014 | Schwarz |
| 2015/0198715 A1 | 7/2015 | Garay et al. |
| 2016/0264436 A1 | 9/2016 | Hayakawa et al. |

FOREIGN PATENT DOCUMENTS

| | | |
|---|---|---|
| CN | 102906305 A | 1/2013 |
| CN | 103649534 A | 3/2014 |
| CN | 104487253 A | 4/2015 |
| DE | 2508927 A1 | 9/1976 |
| DE | 102005010847 A1 | 9/2006 |
| DE | 60030007 T2 | 4/2007 |
| DE | 102007052770 A1 | 5/2009 |
| DE | 102015100395 A1 | 8/2015 |
| DE | 102014104996 A1 | 10/2015 |
| EP | 0222258 A2 | 5/1987 |
| EP | 1946843 A1 | 7/2008 |
| JP | 2004294248 A | 10/2004 |
| WO | 0197983 A1 | 12/2001 |

OTHER PUBLICATIONS

Yaxin, Liu, "Research on NonContact Liquid Dispensing Technology and System", Dissertation for a Doctoral Degree in Engineering, Harbin Institute of Technology, Apr. 2009, 147 pages (in 3 parts).

* cited by examiner

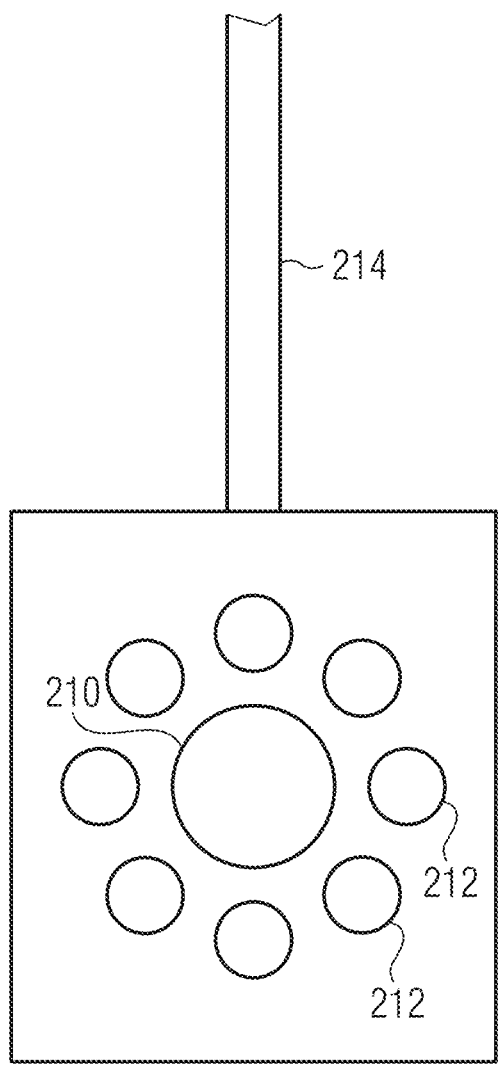

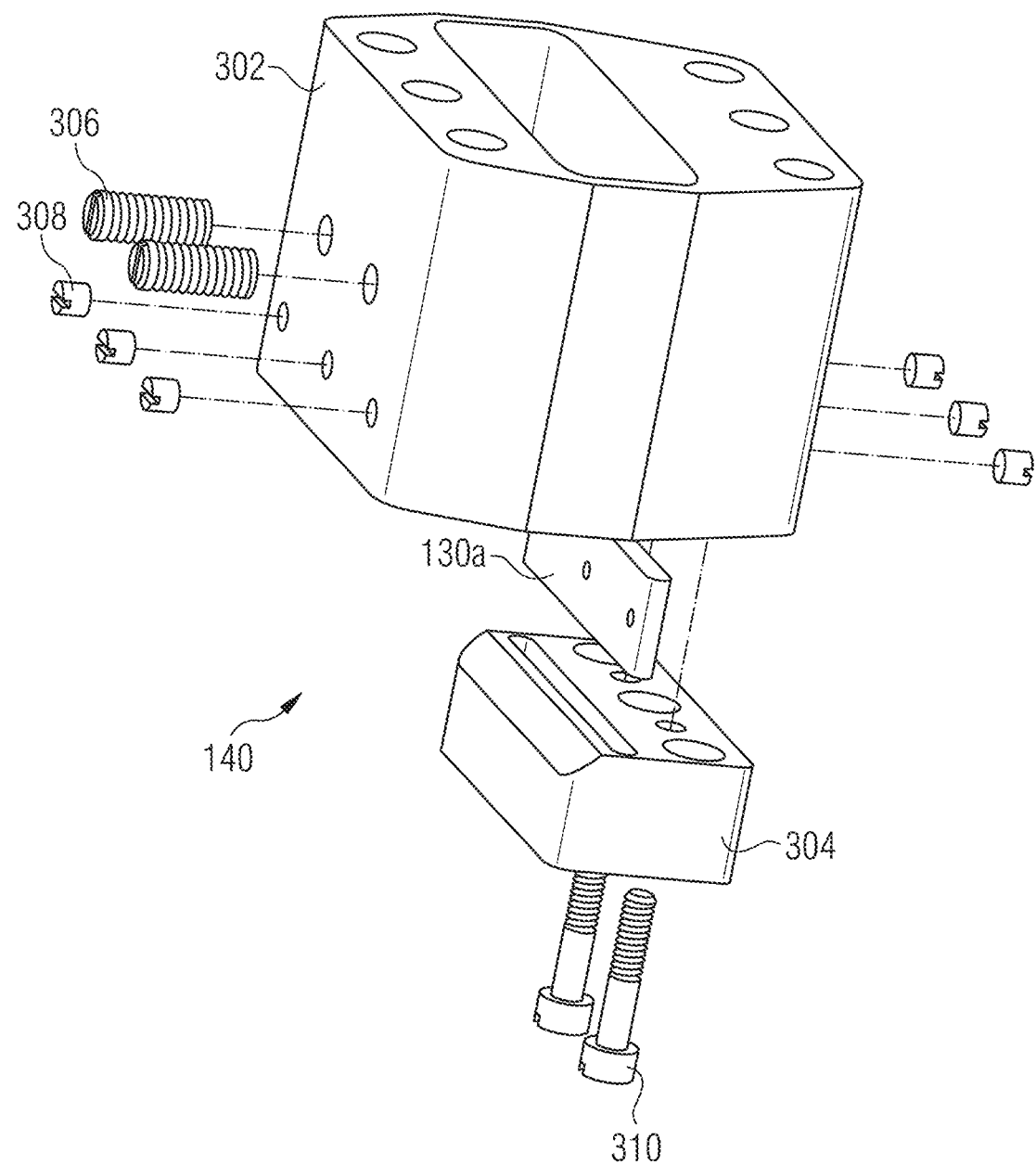

CROSS SECTION A-A

FIG. 4a

| Detected light intensity | Media on/off | Tool Stop | Comment |
|---|---|---|---|
| high | on | Ok | Working well |
| low | on | STOP | Detection Error/ Media Interruption |
| low | off | Ok | Working well |
| high | off | STOP | Dripping detected |

- Last high value
- Actual high value
- Minimum threshold

Self adjustment of detection limits & Advanced error handling

External Evaluation
- Monitoring
- APC
- ...

Spin-Etch Tool

Tool Stop

Media on/off, valves

Detected light intensity

Detection Head

SPS

LIQUID-DISPENSING SYSTEM, APPARATUS AND METHOD

CROSS-REFERENCE TO RELATED APPLICATIONS

This application is a continuation of U.S. patent application Ser. No. 15/666,928, filed Aug. 2, 2017, which application claims priority to German patent application No. 102016114607.2, filed on Aug. 5, 2016, which applications are hereby incorporated herein by reference in its entirety.

TECHNICAL FIELD

Embodiments relate to concepts for a liquid-dispensing system and in particular to a liquid-dispensing system, an apparatus for providing a control signal for a liquid-dispensing system and a method for providing a control signal for a liquid-dispensing system.

BACKGROUND

Dispensing liquids is a major processing step in many chemical and chemo-mechanical applications. In many cases, it may be important to dispense an exact amount of liquid or to avoid cross-contamination of liquids, e.g. between processing steps. Some approaches rely on suck-back valves to avoid dripping of liquids after a deactivation of a liquid flow through a nozzle.

SUMMARY

There may be a demand to provide an improved concept for liquid-dispensing systems, which enables reducing failures or unwanted behavior due to improperly dispensed liquids.

Such a demand may be satisfied by the subject matter of the claims.

Some embodiments relate to a liquid-dispensing system. The liquid-dispensing system comprises at least one nozzle configured to dispense a liquid. The liquid-dispensing system comprises at least one sensor module configured to provide a sensor signal comprising information related to whether liquid is dispensed by the nozzle. At least a portion of the at least one sensor module is located in proximity of the nozzle.

Some embodiments relate to an apparatus for providing a control signal for a liquid-dispensing system. The apparatus comprises at least one interface configured to receive a sensor signal comprising information related to whether a liquid is dispensed by a nozzle of the liquid-dispensing system. The apparatus further comprises a control module configured to detect an erroneous dispensing of liquid by the nozzle based on the sensor signal. The at least one interface is configured to provide a control signal based on a detected erroneous dispensing of liquid by the nozzle.

Some embodiments relate to a method for providing a control signal for a liquid-dispensing system. The method comprises obtaining a sensor signal comprising information related to whether a liquid is dispensed by a nozzle of the liquid-dispensing system. The method further comprises detecting an erroneous dispensing of liquid by the nozzle based on the sensor signal. The method further comprises providing a control signal based on a detected erroneous dispensing of liquid by the nozzle.

BRIEF DESCRIPTION OF THE DRAWINGS

Some embodiments of apparatuses and/or methods will be described in the following by way of example only, and with reference to the accompanying figures, in which:

FIG. 2b illustrates a schematic cross section of a sensor module;

FIGS. 3a-3f show schematic illustrations of elements of a housing for a liquid-dispensing system;

FIG. 4a illustrates a block diagram of an embodiment of an apparatus for providing a control signal for a liquid-dispensing system.

DETAILED DESCRIPTION OF ILLUSTRATIVE EMBODIMENTS

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown byway of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
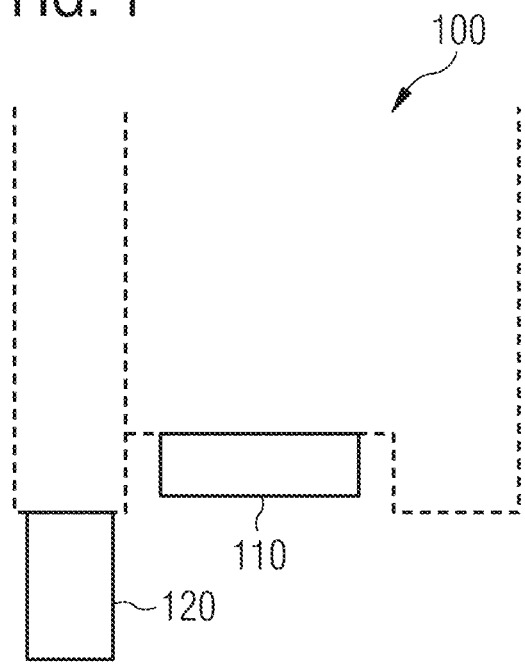
FIG. 1 shows a schematic cross-section of a liquid-dispensing system.

FIG. 1 shows a schematic cross-section of a liquid-dispensing system 100. The liquid-dispensing system comprises at least one nozzle 110 configured to dispense a liquid. The liquid-dispensing system further comprises at least one sensor module 120, configured to provide a sensor signal comprising information related to whether liquid is dispensed by the nozzle. At least a part of the at least one sensor module 120 is located in proximity of the nozzle.

The sensor signal may be used to detect dripping of liquids from deactivated nozzles, which may enable detecting errors in a production process (e.g. in a wafer production process) during manufacturing. If the dripping is detected early on, appropriate steps may be taken to avoid contamination of additional processing materials. Furthermore, the sensor signal may be used to monitor a flow of the liquid, e.g. to detect a positive or negative deviance from a planned amount of liquid to be dispensed. For example, the amount of liquid (to be dispensed) may relate to a time period, over which the liquid is dispensed, and/or to a volume of liquid dispensed per time unit.

The liquid-dispensing system 100 may correspond to a liquid-dispensing system of a chemical or chemo-mechanical manufacturing system. For example, the liquid-dispensing system 100 may correspond to a liquid-dispensing system of a semiconductor wafer processing plant. For example, the liquid-dispensing system 100 may be configured to dispense at least one liquid for chemical or chemo-mechanical processing, for example. For example, the liquid-dispensing system may further comprise at least one liquid tank suitable for storing the at least one liquid. For example, the liquid-dispensing system may further comprise at least one valve configured to control a flow of the at least one liquid. For example, the liquid-dispensing system may further comprise at least one suck-back valve, configured to suck-back remaining fluid after closure of the at least one suck-back valve.

For example, the at least one nozzle 110 may comprise a pipe or tube, for example. The at least one nozzle 110 may be configured to direct or modify a flow of at least one liquid, for example. For example, a first inner diameter of the nozzle at a first opening of the nozzle may be at least 10% larger than a second inner diameter of the nozzle at a second opening of the nozzle. For example, the nozzle 110 may be vertically attached to a valve of the liquid-dispensing system 100, for example. For example, the at least one nozzle 110 may be located below at least one valve of the liquid-dispensing system 100, for example. For example, an egress opening (lower opening) of the at least one nozzle may comprise an inner diameter of less than 2 cm (or less than 1 cm, less than 8 mm, less than 6 mm, less than 5 mm, less than 4 mm, less than 3 mm, or less than 2 mm). For example, the at least one nozzle may be configured to dispense less than 2 liters of liquid per hour (l/h) (or less than 3 l/h, less than 5 l/h, less than 10 l/h). For example, the liquid-dispensing system 100 may comprise at least two nozzles. A first nozzle of the at least two nozzles may be configured to dispense a first liquid and a second nozzle of the at least two nozzles may be configured to dispense a second liquid being different from the first liquid. For example, the at least two nozzles may be configured to dispense at least two different liquids. For example, the liquid-dispensing system may comprise two or more nozzles 110 and two or more sensors 120, configured to provide the sensor signal comprising information related to whether the liquid is dispensed by the two or more nozzles.

For example, the liquid may correspond to an acid or a solvent, e.g. to sulfuric acid ($H_2SO_4$), nitric acid ($HNO_3$) or hydrofluoric acid (HF). For example, the liquid may correspond to a photoresist liquid, e.g. Poly(methyl methacrylate) (PMMA), Poly(methyl glutarimide) (PMGI), Phenol formaldehyde resin (diazonaphthoquinone (DNQ)/Novolac), SU-8 or Off-Stoichiometry Thiol-Enes (OSTE) Polymers. For example, the liquid may correspond to a liquid used in chemical or chemo-mechanical processing.

For example, the at least one sensor module 120 may comprise a receiver component (e.g. a sensor) and an emitter component (e.g. an electromagnetic or sound emitter).

For example, the at least one sensor module 120 may be configured to measure electromagnetic radiation, e.g. an intensity or power of the electromagnetic radiation. For example, the at least one sensor module 120 may comprise at least one optical sensor, e.g. an electro-optical sensor. The optical sensor may be used to detect the flow of the liquid from the nozzle, and may enable the detection of the liquid through refraction or absorption of light, for example. The optical sensor may be configured to generate the sensor signal based on light received after interacting with liquid dispensed by the at least one nozzle (e.g. after passing or crossing a path of falling of liquid dispensed by the at least one nozzle). For example, the interaction may be a refraction or reflection of the light caused by the liquid dispensed by the at least one nozzle. The sensor signal may comprise optical sensor information. For example, the at least one optical sensor may be configured to measure a physical quantity of light hitting the optical sensor and provide the sensor signal based on the physical quantity of light. For example, a first physical quantity of light may be higher when liquid is dispensed by the at least one nozzle than a second physical quantity of light when no liquid is dispensed by the at least one nozzle. For example, the at least one optical sensor may be configured to determine the sensor signal based on a refraction or reflection of light caused by the liquid (medium). For example, the at least one sensor module 120 may be configured to measure an intensity of light (or electromagnetic radiation) hitting the at least one sensor module 120 (e.g. the at least one optical sensor) for the sensor signal. For example, the optical sensor may comprise at least one of a photoconductive module, a photovoltaic module, a photodiode or a phototransistor.

For example, the at least one sensor module may further comprise one or more optical fibers. For example, one end of each of the one or more optical fibers may be located in a proximity of the nozzle. For example, at least a subset of the one or more optical fibers (receiver fibers) may be coupled to the at least one optical sensor (photo detector). For example, another subset of the one or more optical fibers (emitter fibers) may be coupled to an electromagnetic emitter module, e.g. a light emitter module. For example, the at least one optical sensor and the electromagnetic emitter module may be located further away from the at least one nozzle than the one end of the one or more optical fibers. For example, a subset of the one or more optical fibers may be configured to transport light emitted by the electromagnetic emitter module (light emitter module) towards a path of liquid dispensed by the at least one nozzle. For example, another subset of the one or more optical fibers may be configured to transport light reflected or refracted by the liquid dispensed by the at least one nozzle towards the optical sensor. For example, the optical sensor and/or the emitter module may be located at a distance of at least 10 cm (or at least 20 cm, at least 30 cm, at least 50 cm) from the at least one nozzle. For example, the optical sensor and/or the emitter module may be located outside a chemically resistant housing of the at least one sensor module.

For example, the at least one sensor module 120 may comprise an imaging sensor (camera sensor), configured to convert light or other electromagnetic radiation influenced by dispensed liquid to electronic signals, and to provide the sensor signal based on the converted light or other electromagnetic radiation.

For example, the liquid-dispensing system (e.g. the at least one sensor module) may further comprise at least one acoustic emitter module configured to emit ultrasound. The at least one sensor module 120 may be configured to generate the sensor signal based on an influence of dispensed liquid on the ultrasound. The at least one acoustic emitter module may be configured to emit ultrasound having a frequency between 20 kHz (or 50 kHz, 100 kHz, 1 MHz, 100 MHz) and 5 GHz (or 1 GHz, 500 MHz, 200 MHz), for example. Using the ultrasound range may enable a usage of available sensor modules and analysis techniques. The at least one sensor module 120 may be configured to measure the ultrasound transmitted by the at least one acoustic emitter module and influenced by dispensed liquid.

For example, the at least one sensor module 120 may comprise an inductive sensor, e.g. a field sensor. The at least one sensor module 120 may be configured to induce eddy currents in liquid dispensed by the at least one nozzle, e.g. the at least one sensor module 120 may comprise an induction loop configured to emit the eddy currents. The at least one sensor module 120 may be configured to generate the sensor signal based on an intensity of eddy currents induced in the dispensed liquid. For example, a field sensor of the at least one sensor module 120 may be configured to detect a change in the inductance of the induction loop caused by the dispensed liquid. Using eddy currents to determine the sensor signal may enable inductive measuring of the dispensing of the liquid.

For example, the at least one sensor module 120 may comprise a capacitive sensor module. The at least one sensor module 120 may be configured to generate the sensor signal based on an capacitance formed between the passing liquid and the sensor module 120, for example.

For example, the sensor signal may comprise analog sensor information or digital sensor information. For example, the sensor signal may be proportional to an electromagnetic radiation measured by the at least one sensor module. For example, the at least one sensor module 120 may be configured to convert an analog signal measured by a sensor, e.g. an optical sensor or an inductive sensor, to a digital representation of the analog signal measured by the sensor, and the sensor signal may comprise the digital representation of the analog signal, e.g. as digital bit values according to a specified code. For example, the sensor signal may comprise the analog signal or a transformation of the analog signal. The sensor signal may comprise an electronic signal, an optical signal or a radio signal, for example.

For example, the liquid-dispensing system 100 may further comprise at least one interface, configured to transmit the sensor signal provided by the at least one sensor module 120. The at least one interface may correspond to one or more inputs and/or outputs for receiving and/or transmitting information, which may be in digital (bit) values according to a specified code, within a module, between modules or between modules of different entities.

The information related to whether the liquid is dispensed by the at least one nozzle may comprise information related to at least one of an amount (e.g. information related to a duration of a time period, during which the liquid is dispensed and/or information related to a volume of liquid dispensed per time unit) of liquid dispensed by the at least one nozzle, an influence of the liquid dispensed by the at least one nozzle on electromagnetic radiation (e.g. light) or ultrasound measured by the at least one sensor module, an intensity of electromagnetic radiation sound waves (e.g. light) or ultrasound influenced by dispensed liquid, a refraction of electromagnetic radiation (e.g. light) or ultrasound influenced by dispensed liquid and a dripping of liquid from the at least one nozzle.

For example, the at least a part of the at least one sensor module 120 may be located in a proximity of the liquid dispensed by the nozzle. For example, a lateral distance between a part (e.g. an end of an optical fiber) of the at least one sensor module and the liquid dispensed by the at least one nozzle may be less than 5 cm (or less than 4 cm, less than 3 cm, less than 2 cm, less than 1 cm, or less than 5 mm). A low lateral distance may enable a more precise monitoring or detection of dispensed liquid. For example, the lateral distance between the at least one sensor module and the dispensed liquid may depend on a diameter of the liquid dispensed by the at least one nozzle 110.

For example, a lateral distance between (the part of) the at least one sensor module and the at least one nozzle may be less than 5 cm (or less than 4 cm, less than 3 cm, less than 2 cm, less than 1 cm, less than 5 mm, or less than 1 mm). For example, the at least part of the sensor module located in proximity of the nozzle may comprise at least one (optical) sensor or an optical fiber. For example, the at least one nozzle may be located within a void of a housing comprising at least a part of the at least one sensor module, for example.

For example, at least a part of the at least one sensor module 120 may be located vertically below the egress of the nozzle and laterally offset from a lateral center of the nozzle by at least the inner radius of the nozzle (or at least the inner radius of the nozzle plus 1 mm, plus 2 mm, plus 3 mm, plus 4 mm, plus 5 mm, plus 1 cm). For example, a vertical distance between (a part of) the at least one sensor module and the egress of the nozzle may be less than 5 cm (or less than 4 cm, less than 3 cm, less than 2 cm, less than 1 cm, less than 5 mm, or less than 1 mm).

For example, the liquid-dispensing system 100 may further comprise a carrier structure (e.g. chuck or rotatable table) for holding a semiconductor wafer below the at least one nozzle. For example, a path of the dispensed liquid may end at the semiconductor wafer. For example, a vertical distance between the carrier structure and the at least one nozzle 110 may be more than 10 cm (or more than 15 cm, more than 20 cm, more than 25 cm) and/or less than 50 cm (or less than 40 cm, less than 30 cm, less than 20 cm, less than 15 cm). The semiconductor wafer may be a silicon wafer. Alternatively, the semiconductor wafer may be a wide band gap semiconductor wafer having a band gap larger than the band gap of silicon (1.1 eV). For example, the semiconductor wafer may be a silicon carbide (SiC)-based semiconductor wafer, or gallium arsenide (GaAs)-based semiconductor wafer, or a gallium nitride (GaN)-based semiconductor wafer. The semiconductor wafer may have a lateral diameter of more than 100 mm (or more than 200 mm, more than 290 mm, more than 400 mm). The semiconductor wafer may have a lateral diameter of less than 500 mm (or less than 400 mm, less than 250 mm, less than 180 mm). For example, the semiconductor wafer may have a lateral diameter of 150 mm, 200 mm, 300 mm or 450 mm (e.g. ±10%).

For example, the liquid-dispensing system 100 may further comprise an apparatus for providing a control signal for the liquid-dispensing system, e.g. an apparatus 400 for providing a control signal for a liquid-dispensing system described in connection with FIG. 4. For example, the liquid-dispensing system 100 may be configured to control an operation of the liquid-dispensing system 100 or of a chemical or chemo-mechanical processing plant comprising the liquid-dispensing system 100 based on the control signal. Embodiments further provide a chemical or chemo-mechanical processing plant (e.g. a spin-etch tool/a semiconductor wafer fabrication plant) comprising the liquid-dispensing system 100.

For example, a vertical direction, a vertical distance and a vertical dimension may be measured in parallel with a local gravity vector. A lateral direction, a vertical distance and lateral dimensions may be measured orthogonal to the vertical direction.

Figure 2:
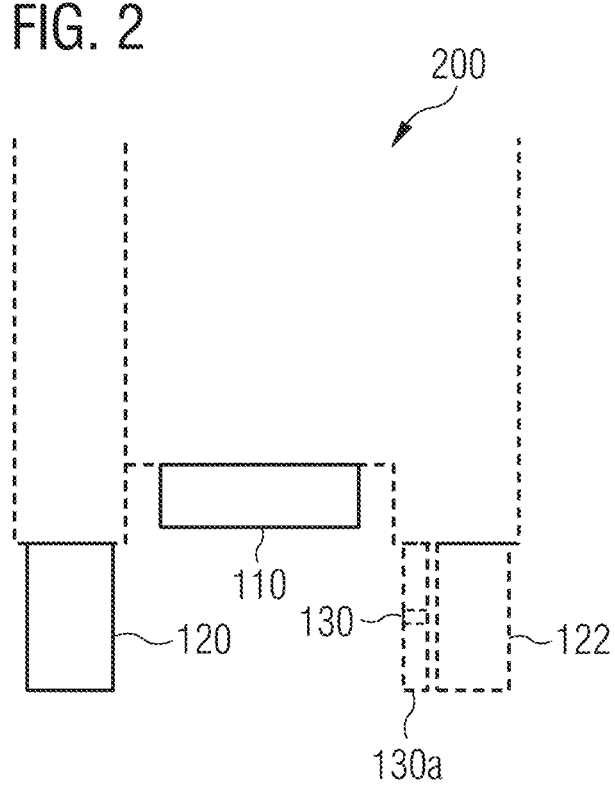
FIG. 2 shows a schematic cross-section of a liquid-dispensing system comprising an electromagnetic emitter module.

FIG. 2 illustrates a schematic cross-section diagram of an embodiment of a liquid-dispensing system 200. The liquid-dispensing system 200 may be implemented similar to the liquid-dispensing system described in connection with FIG. 1. The liquid-dispensing system may additionally comprise at least one electromagnetic emitter module 122 configured to emit electromagnetic radiation towards a path of falling of liquid dispensed by the at least one nozzle (e.g. towards at least a part of the at least one sensor module). At least one sensor module 120 may be configured to provide the sensor signal based on an influence of dispensed liquid on the electromagnetic radiation. For example, the at least one sensor module may comprise the at least one electromagnetic emitter module.

The at least one electromagnetic emitter module may enable detecting whether the liquid is dispensed, e.g. by enabling a measurement of the influence of the liquid on the electromagnetic radiation by the at least one sensor module, e.g. a refraction or absorption of the electromagnetic radiation by the liquid.

For example, the at least one electromagnetic emitter module 122 may comprise at least one light emitter module, configured to emit light. The at least one electromagnetic emitter module 122 may be configured to emit light having a wavelength between 100 nm and 100 µm, for example. Using the (visible) light range may enable a usage of available sensor modules and may facilitate analysis of the sensor signal, as an influence of the liquid on the (visible) light may be well-researched. For example, the at least one electromagnetic emitter module 122 may be configured to emit electromagnetic radiation within a visible light range, e.g. electromagnetic radiation having a wavelength between 300 nm and 800 nm. For example, the at least one electromagnetic emitter module may comprise at least one of a Light Emitting Diode (LED) or a laser diode. For example, the at least one electromagnetic emitter module 122 may be configured to emit light (electromagnetic radiation) having a beam angle of less than 20° (or less than 15°, less than 12°, less than 10°, less than 8°, less than 5°, less than 2°).

For example, the at least one electromagnetic emitter module 122 may be configured to emit electromagnetic radiation at a wavelength, at which more than 30% (or more than 40%, more than 50%, more than 60%, more than 70%, more than 80%, more than 90%) of a portion of the electromagnetic radiation hitting liquid dispensed by the at least one nozzle passes liquid dispensed by the at least one nozzle. For example, the at least one electromagnetic emitter module 122 may be configured to emit electromagnetic radiation at a wavelength, at which less than 70% (or less than 60%, less than 50%, less than 40%, less than 30%, less than 20%, less than 10%) of a portion of the electromagnetic radiation hitting the liquid dispensed by the at least one nozzle is absorbed or reflected by the liquid. Using electromagnetic radiation at a wavelength, at which the electromagnetic radiation only partially absorbed by the liquid may enable using refraction to determine, whether the liquid is dispensed, while remaining independent from a change in the absorption behavior of the liquid. For example, the at least one electromagnetic emitter module 122 may be configured to emit electromagnetic radiation based on physical (e.g. refraction, attenuation or reflection) properties of the liquid dispensed by the at least one nozzle.

For example, the liquid-dispensing system 200 may further comprise at least one aperture 130. An aperture structure 130a may comprise the at least one aperture 130, for example. The aperture may enable a more well-defined propagation of the electromagnetic radiation, and may enable measuring a more pronounced difference between a liquid being dispensed and no liquid being dispensed. The at least one aperture 130 may be configured to shield the at least one sensor module 120 from at least a part of the electromagnetic radiation emitted by the at least one electromagnetic emitter module 122. The at least one aperture 130 may be configured to narrow the beam angle of the electromagnetic radiation emitted by the at least one electromagnetic emitter module 122, for example. Due to the more narrow beam angle, a positioning of the at least one sensor module 120 and of the at least one electromagnetic emitter module may be less sensitive to misalignment. The at least one aperture 130 may comprise a pinhole aperture (circular aperture) or a slit aperture, for example. The aperture structure 130a may correspond to a cuboid shape comprising the at least one aperture 130. The aperture structure 130a may be comprised in a may be a part of a housing of the liquid-dispensing system, for example. The at least one aperture 130 may comprise a void or a transparent or semi-transparent material. The aperture structure 130a comprising the at least one aperture may be configured to absorb or reflect the electromagnetic radiation emitted by the at least one electromagnetic emitter module 122 except for the electromagnetic radiation emitted through the at least one aperture 130, for example. For example, the at least one aperture may comprise a semi-transparent material. The semi-transparent material may shield the at least one electromagnetic emitter module 122 from the liquid and may deter depositing of the liquid within the at least one aperture. Alternatively, a semi-transparent housing may comprise the at least one electromagnetic emitter module 122 and the aperture structure comprising the at least one aperture 130. The at least one aperture may comprise an inner diameter of less than 1 cm (or less than 5 mm, less than 4 mm, less than 3 mm, or less than 2 mm). The aperture may comprise a minimal width of less than 10 mm (or less than 5 mm, less than 4 mm, less than 3 mm, or less than 2 mm) and more than 0.4 mm (more than 0.5 mm, more than 1 mm, more than 2 mm, more than 4 mm), for example. The width (inner diameter) of the at least one aperture may define an angle beam of the beam of electromagnetic radiation traversing the at least one aperture. For example, the width (inner diameter) of the at least one aperture may depend on a diameter of a stream of liquid dispensed by the at least one nozzle and/or from a distance between the stream of liquid, the at least one aperture and the at least one sensor module 120, for example. For example, a lateral distance between the at least one aperture 130 (or the aperture structure) and the dispensed liquid may be less than 2 cm (or less than 1 cm, or less than 5 mm). A small lateral distance between the aperture and the dispensed liquid may enable a more concentrated stream of electromagnetic radiation when hitting the liquid. For example, a lateral distance between the at least one electromagnetic emitter module 122 and the at least one aperture 130 may be less than 5 cm (or less than 2 cm, less than 2 cm, or less than 5 mm). For example, the distance between the at least one aperture and the dispensed liquid may depend on a refraction index of the dispensed liquid and/or on a lateral length and an inner diameter of the at least one aperture 130, for example.

For example, the at least one sensor module 120 may be configured to determine the sensor signal based on a refraction (or diffraction) of the emitted electromagnetic radiation caused by dispensed liquid. Using the refraction to determine the sensor signal (comprising information related to whether the liquid is dispensed by the at least one nozzle) may enable using the at least one sensor module and electromagnetic emitter module with different liquids or with liquids changing their absorption behavior over time. For example, dispensed liquid may act as a lens bundling the electromagnetic radiation (light). Dispensed liquid may narrow a beam angle of the electromagnetic radiation, for example.

For example, the at least one sensor module 120 may be configured to determine the sensor signal based on a reflection of the emitted electromagnetic radiation caused by dispensed liquid. For example, the at least one sensor module may comprise the at least one emitter module, e.g. the at least one sensor module may share a housing with the at least one emitter module. For example, an optical fiber coupled to an optical sensor of the at least one sensor module may be adjacent to one or more optical fibers coupled to the at least one emitter module. The at least one emitter module may be configured to emit light through the one or more optical fibers, which may be reflected by liquid dispensed by the at least one nozzle, and the optical sensor may be configured to detect light reflected by the dispensed liquid and transported through the optical fiber towards the optical sensor.

For example, a portion of the electromagnetic radiation emitted by the at least one electromagnetic emitter module 122 received by the at least one sensor module 120 while liquid is dispensed by the at least one nozzle may be at least 10% (or at least 20%, at least 30% higher, at least 50%) higher (or lower) than a portion of the electromagnetic radiation emitted by the at least one electromagnetic emitter module 122 received by the sensor module while no liquid is dispensed by the at least one nozzle, e.g. due to refraction. For example, a first portion of the electromagnetic radiation emitted by the at least one electromagnetic emitter module 122 received by the at least one sensor module 120 while liquid is dispensed by the at least one nozzle may be at least 10% higher (or at least 20% higher, at least 50% higher) than a second portion of the electromagnetic radiation emitted by the at least one electromagnetic emitter module 122 received by the at least one sensor module 120 while no liquid is dispensed by the at least one nozzle. For example, a first portion of the electromagnetic radiation emitted by the at least one electromagnetic emitter module 122 received by the at least one sensor module 120 while liquid is dispensed by the at least one nozzle may be at least 10% lower (or at least 20% lower, at least 50% lower) than a second portion of the electromagnetic radiation emitted by the at least one electromagnetic emitter module 122 received by the at least one sensor module 120 while no liquid is dispensed by the at least one nozzle. For example, (an inner diameter or location of) the at least one aperture 130, (a size or location of) the at least one sensor module 120 and/or (a beam angle or location of) the at least one electromagnetic emitter module 122 may be arranged and configured so that a first portion of the electromagnetic radiation emitted by the at least one electromagnetic emitter module 122 received by the at least one sensor module 120 while liquid is dispensed by the at least one nozzle may be at least 10% higher (or at least 20% higher, at least 50% higher) than a second portion of the electromagnetic radiation emitted by the at least one electromagnetic emitter module 122 received by the at least one sensor module 120 while no liquid is dispensed by the at least one nozzle.

Figure 2A:
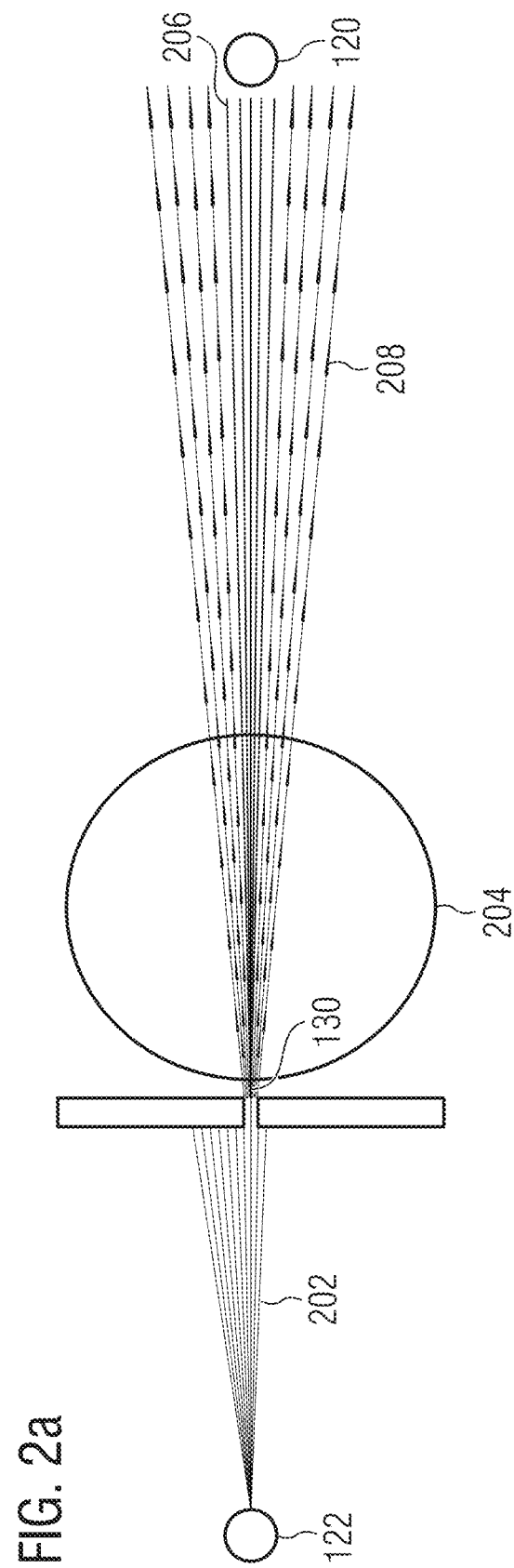
FIG. 2a illustrates an example of a lens effect caused by a dispensed liquid.

FIG. 2a illustrates an example of a lens effect caused by dispensed liquid. The at least one electromagnetic emitter module 122 (emitter) is configured to emit light 202 through the pinhole aperture 130. The liquid 204 narrows the angle of the beam (due to refraction), resulting in a more narrow beam 206 (solid lines), in comparison to a beam 208 not influenced by the liquid 204 (dashed lines). The at least one sensor module 120 (detector) is configured to measure the intensity of the light 202 hitting the at least one sensor module 120, which may be higher for the more narrow beam 206 than for the less narrow beam 208, for example. Without an aperture, there may be a competition between refraction and absorption, with differences being hard to detect and masked by a change, e.g. when the liquid changes color and refraction behavior over time.

FIG. 2b illustrates a schematic cross section of a sensor module comprising an optical fiber 210 coupled to an optical sensor of the sensor module and a plurality of optical fibers 212 coupled to at least one electromagnetic emitter module (light emitter module). The optical fibers may be bundled 214 and may lead towards the optical sensor and the at least one electromagnetic emitter module. FIG. 2b may illustrate an optical dual (multi)-core fiber in a coaxial setup. One fiber may be used for the emitter (electromagnetic emitter module) and the other fiber/fibers may be used for the receiver (optical sensor). For example, the optical fiber 210 coupled to the optical sensor may comprise a larger diameter (e.g. an at least 20% larger diameter) than optical fibers of the plurality of optical fibers 212 coupled to the at least one electromagnetic emitter module. For example, the optical fiber 210 coupled to the optical sensor may comprise a diameter of approximately 0.5 mm and the optical fibers of the plurality of optical fibers 212 coupled to the at least one electromagnetic emitter module may comprise a diameter of approximately 0.25 mm.

More details and aspects of the liquid-dispensing system 200 are mentioned in connection with the proposed concept or one or more examples described above or below (e.g. FIG. 1, FIGS. 3-5). The liquid-dispensing system 200 may comprise one or more additional optional features corresponding to one or more aspects of the proposed concept or one or more examples described above or below.

Figure 3:
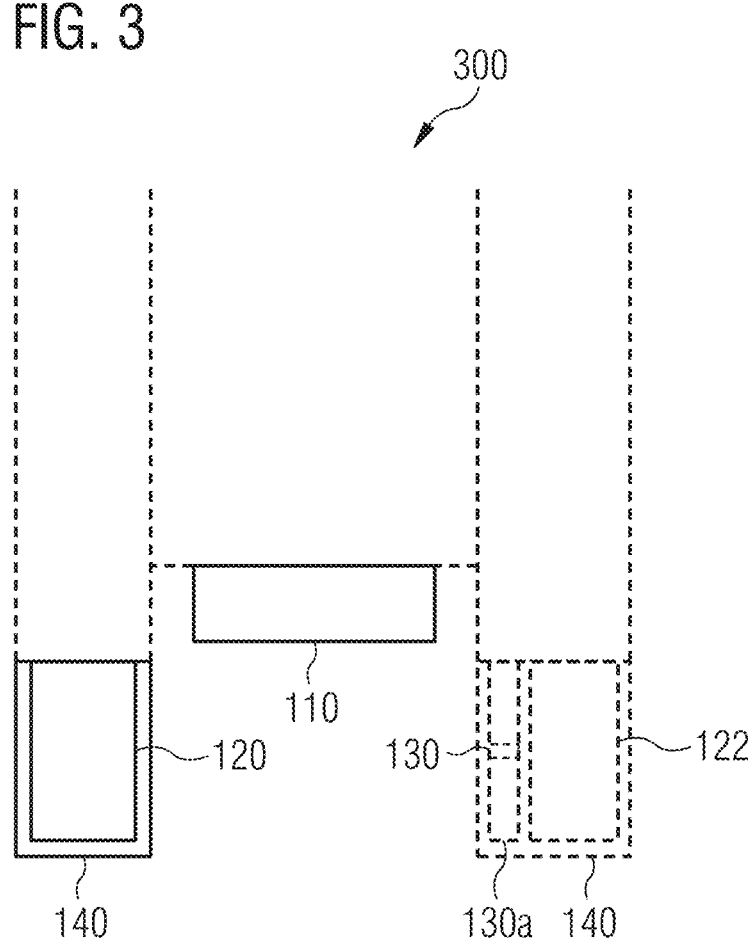
FIG. 3 shows a schematic cross-section of a liquid-dispensing system comprising a housing.

FIG. 3 shows a schematic cross-section of a liquid-dispensing system 300. The liquid-dispensing system 300 may be implemented similar to one of the liquid-dispensing system described in connection with FIGS. 1-2. The liquid-dispensing system 300 comprises at least one nozzle 110 configured to dispense a liquid. The liquid-dispensing system 300 further comprises at least one sensor module 120, configured to provide a sensor signal comprising information related to whether the liquid is dispensed by the nozzle. The liquid-dispensing system 300 further comprises a housing 140 for the at least one sensor module 120. The housing 140 is chemically resistant against at least one of sulfuric acid, nitric acid and hydrofluoric acid. The housing may shield the at least one sensor module and/or the at least one electromagnetic emitter module, for example.

Chemical resistance may be defined according to International Standardization Organization standard ISO 2812, e.g. ISO 2812-1:2007 and ISO 2812-4:2007. The chemical resistance may be based on an optical inspection of a material after prolonged submersion of the material in a liquid (e.g. sulfuric acid, nitric acid or hydrofluoric acid) or after spotting, for example. The housing 140 may be chemically resistant, if prolonged submersion or spotting of the housing 140 in/with one of sulfuric acid, nitric acid and hydrofluoric acid leads to no or minor alteration (intensity of alteration 0 or 1 in accordance with ISO standard ISO 4628-1 to -5) of the housing 140. The housing may comprise a Fluoroelastomer (FKM), e.g. Viton or Viton B, for example. For example, the housing may comprise Polyvinylidene fluoride (PVDF) or Polytetrafluoroethylene (PTFE, Teflon).

For example, the housing may enable a chemically resistant apparatus (e.g. towards $H_2SO_4$ (sulfuric acid), $HNO_3$ (nitric acid), HF (hydrofluoric acid), . . . ). The housing may comprise small dimensions for "plug in" on an existing setup. The housing may comprise a smooth surface to keep within defect density requirements, and prevent adhesion of droplets. The housing may be a closed semi-transparent housing for decreased defect density and prevention of droplet adhesion.

The housing may be configured to protect the at least one sensor module 120 from the liquid dispensed by the at least one nozzle, for example. The housing may be configured to protect at least one electromagnetic emitter module (e.g. at least one electromagnetic emitter module 122 described in connection with FIG. 2) from the liquid dispensed by the at least one nozzle, for example. The housing may be transparent or semi-transparent, for example. For example, at least a part of the housing 140 may comprise a semi-transparent material, e.g. parts of the housing located between the at least one sensor module 120 and the at least one electromagnetic emitter module 122. At least a part of the housing 140 located between at least one of the electromagnetic emitter module 122 or the sensor module 120 and a path of falling of dispensed liquid may comprise a semi-transparent material. The semi-transparent material may enable a protection of the at least one sensor module and/or the at least one electromagnetic emitter module while maintaining a functionality. The semi-transparency may relate to an at least partial transparency of the at least part of the housing towards (visible) light, or to an at least partial transparency of the at least part of the housing towards (other) electromagnetic radiation.

The at least one nozzle 110 may be located within a void comprised in the housing 140, for example. For example, the housing 140 may be attached to a dispensing structure of the liquid-dispensing system 300 comprising the at least one nozzle 110.

For example, the housing 140 may hold or comprise the at least one sensor module 120. For example, at least a portion of the at least one sensor module 120 may extend (e.g. stick out) from the housing 140. For example, at least portions of a wiring structure of the at least one sensor module 120 may be located within the housing 140. The housing 140 may comprise voids, e.g. a void for assembly mounting elements (e.g. screws), a void for inserting the at least one sensor module 120 or the at least one electromagnetic emitter module, and/or a void comprising the at least one nozzle 110.

For example, the liquid-dispensing system 300 may comprise an aperture structure 130a comprising at least one aperture 130. The housing 140 may comprise the aperture structure 130a, for example. Alternatively, the housing 140 may comprise the at least one aperture 130. For example, the aperture carrier 130a may comprise a non-transparent material. The aperture structure 130a may be configured to shield the at least one sensor module 120 from at least a part of the electromagnetic radiation emitted by the electromagnetic emitter module 122, for example.

FIG. 3a illustrates a schematic diagram of a housing 140 according to an embodiment. The housing comprises a first sub structure 302 and a second sub structure 304. The housing 140 further comprises a first plurality of lateral mounting elements 306, a second plurality of lateral mounting elements 308 and a first plurality of vertical mounting elements 310. The housing further comprises an aperture structure 130a comprising at least one aperture (130, as shown in FIG. 3f).

The first plurality of lateral mounting elements 306, the second plurality of lateral mounting elements 308 and/or the first plurality of vertical mounting elements 310 may comprise two or more screws, e.g. hex key screws, slugs or headless screws, for example. A thread of the first plurality of lateral mounting elements 306, the second plurality of lateral mounting elements 308 and/or the first plurality of vertical mounting elements 310 may comprise a diameter larger than 1 mm (or larger than 2 mm, larger than 5 mm, larger than 10 mm, larger than 15 mm), for example. The thread of the first plurality of lateral mounting elements 306, the second plurality of lateral mounting elements 308 and/or the first plurality of vertical mounting elements 310 may comprise a diameter smaller than 20 mm (or smaller than 15 mm, smaller than 10 mm, smaller than 5 mm), for example. The length of the thread of the first plurality of lateral mounting elements 306, the second plurality of lateral mounting elements 308 and/or the first plurality of vertical mounting elements 310 may be larger than 10 mm (or larger than 20 mm, larger than 50 mm, larger than 100 mm). The length of the thread of the first plurality of lateral mounting elements 306, the second plurality of lateral mounting elements 308 and/or the first plurality of vertical mounting elements 310 may be smaller than 100 mm (or smaller than 50 mm, smaller than 20 mm, smaller than 10 mm), for example.

The first plurality of lateral mounting elements 306 may be configured to attach the first sub structure 302 to a sub-structure of the liquid-dispensing system comprising the at least one nozzle. The first plurality of vertical mounting elements 310 may connect (e.g. force fit) the first and second sub structures 302; 304, for example.

Figure 3B:
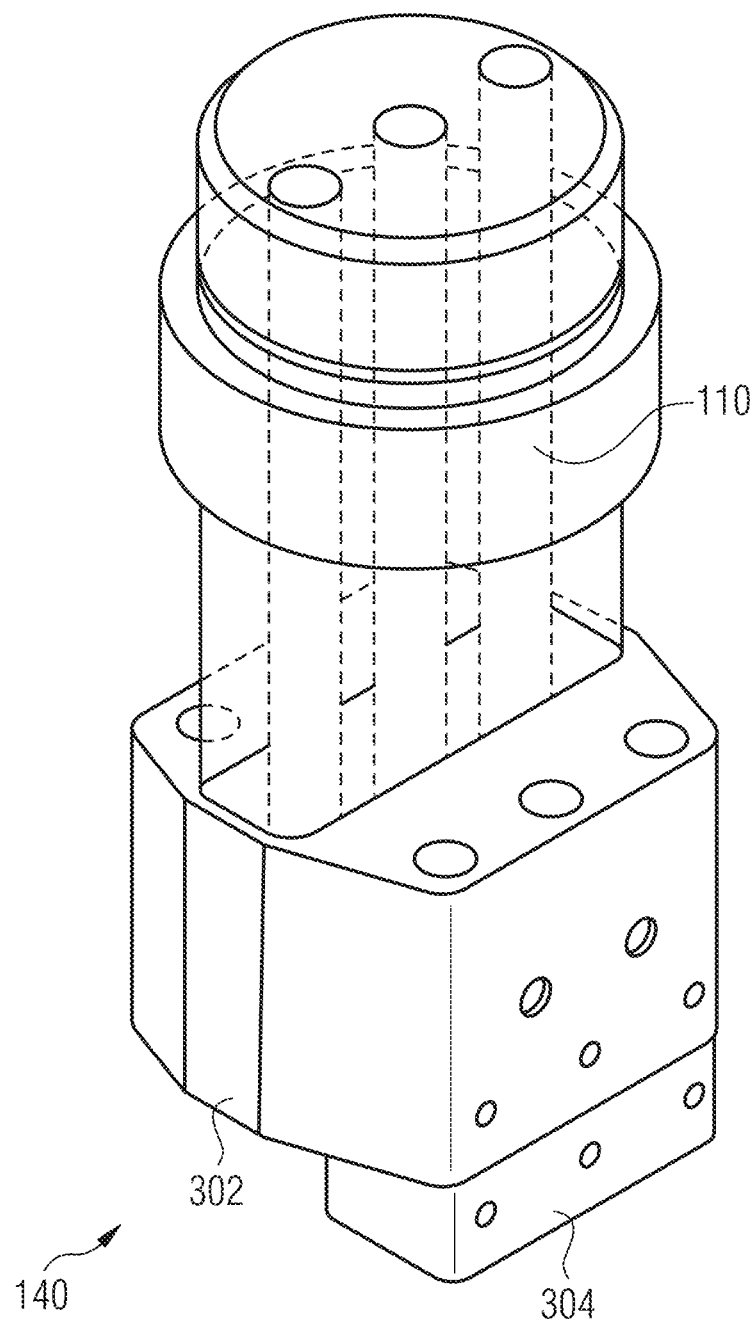
Figure 3C:
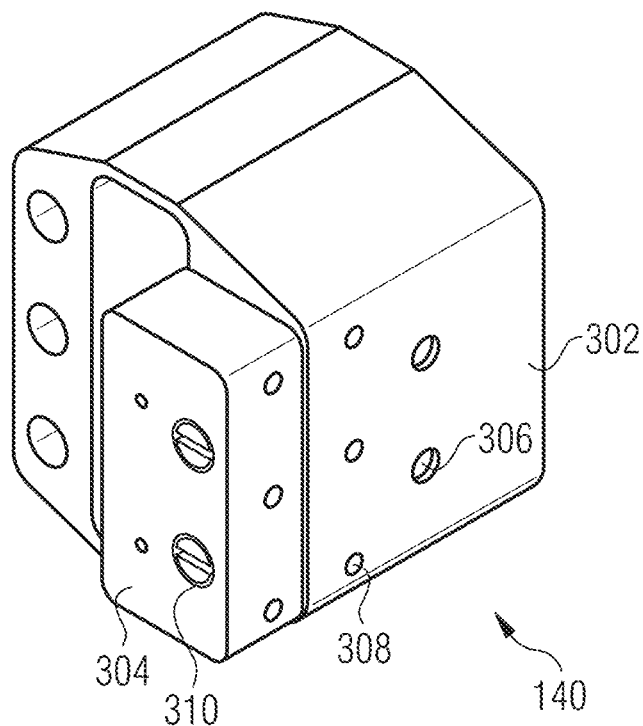
Figure 3D:
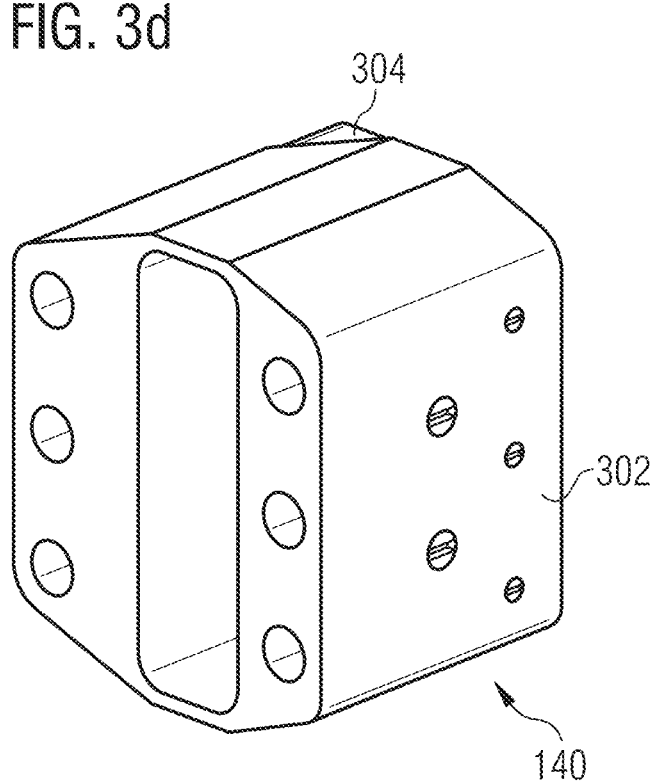

FIG. 3b illustrates a further schematic diagram of a housing 140 according to an embodiment. FIG. 3b further illustrates a position of a sub-structure of the liquid-dispensing system comprising the at least one nozzle 110. FIGS. 3c and 3d show further perspectives of a schematic diagram of a housing 140 according to an embodiment.

For example, a lateral width/length of the housing may be smaller than 10 cm (or smaller than 8 cm, smaller than 5 cm, or smaller than 3 cm), for example. A vertical height of the housing may be smaller than 15 cm (or smaller than 10 cm, smaller than 10 cm, smaller than 5 cm).

Figure 3E:
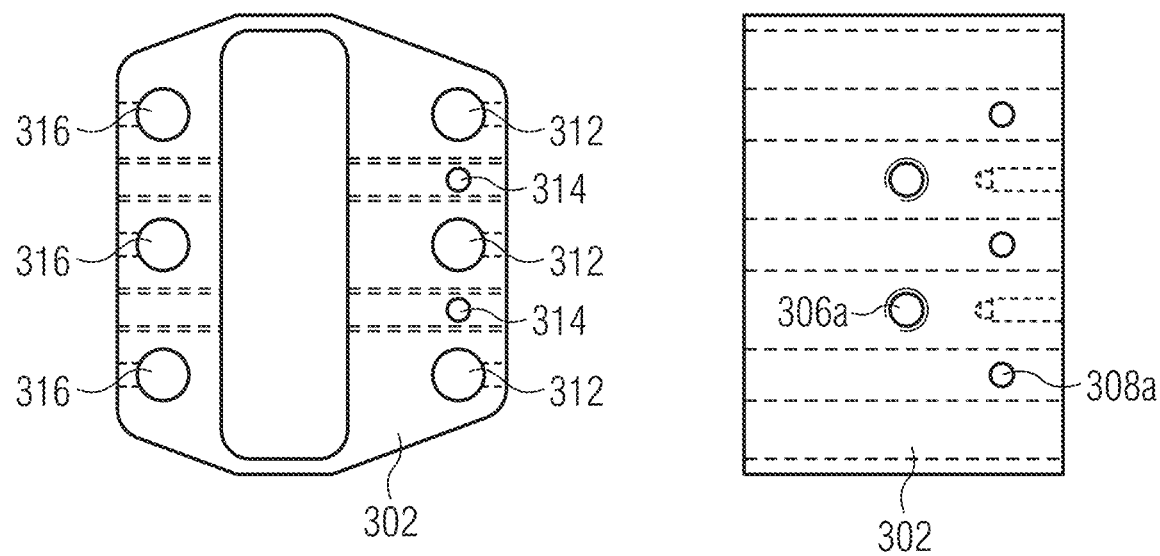
Figure 3E:
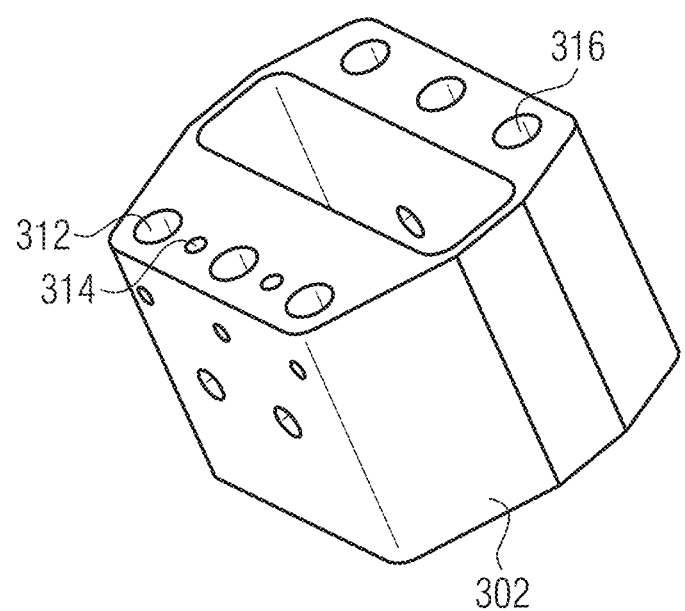
Figure 3F:
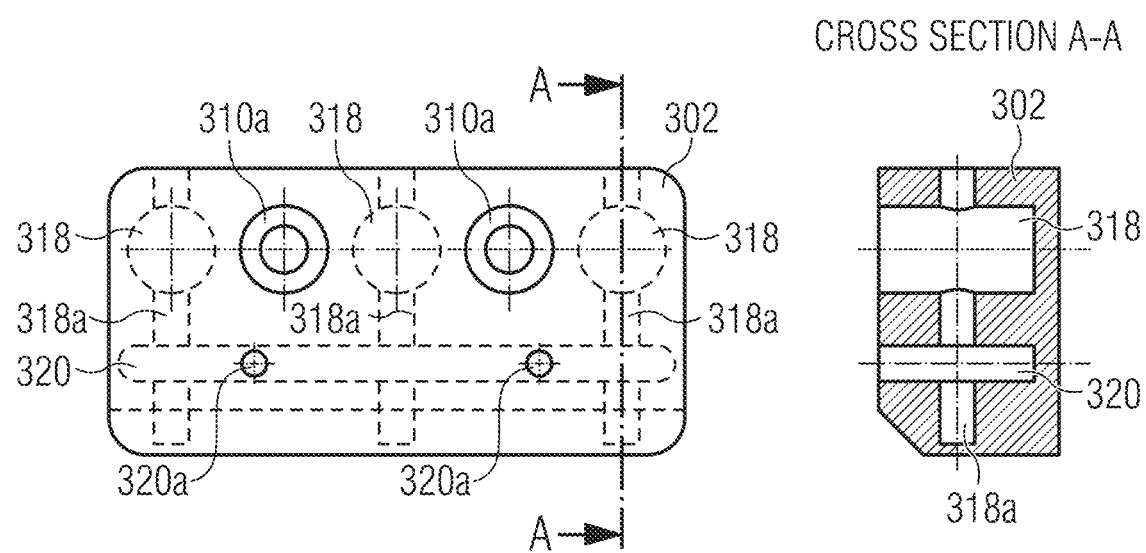
Figure 3F:
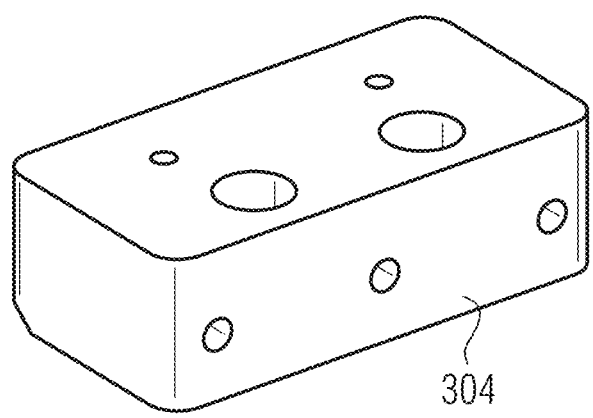

FIG. 3e illustrates schematic diagrams of an embodiment of the first sub structure 302. FIG. 3e comprises a schematic top view, a schematic cross section and a schematic 3D view of the first sub structure 302. The first sub structure 302 may comprise voids (holes) 312; 316 for a wiring structure for the at least one sensor module 120 (316) and/or a wiring structure for the at least one electromagnetic emitter module 122 (312), for example. The first sub structure 302 may further comprise voids (holes) 314 for the first plurality of vertical mounting elements 310, for example. The first sub structure 302 may further comprise voids (holes) 306a; 308a for the first and second lateral mounting elements 306; 308, for example.

FIG. 3f illustrates schematic diagrams of an embodiment of the second sub structure 304. FIG. 3f comprises a schematic top view, a schematic cross section and a schematic 3D view of the second sub structure 304. The second sub structure comprises at least one void (hole) 318, configured to comprise the at least one electromagnetic emitter module 122 and at least one light/electromagnetic radiation shaft 318a; configured to enable a propagation of the electromagnetic radiation emitted by the at least one electromagnetic emitter module 122. The at least one light/electromagnetic radiation shafts 318a may be closed towards the at least one nozzle 110, e.g. to prevent the liquid from entering the at least one light/electromagnetic radiation shaft 318a. The second sub-structure may comprise a transparent or semi-transparent material, for example. The second sub structure 304 may further comprise a cuboid-shaped void 320 for the aperture structure 130a comprising the at least one aperture 130. The second sub structure 304 may further comprise mounting holes 320a for the aperture structure 130a, for example. The second sub structure 304 may comprise a lateral length of less than 100 mm (or less than 50 mm, less than 40 mm, less than 35 mm, less than 20 mm, less than 10 mm) and a lateral width of less than 50 mm (less than 30 mm, less than 20 mm). The at least one light/electromagnetic radiation shaft 318a may comprise a lateral width of less than 10 mm (or less than 5 mm, less than 4 mm, less than 3 mm). The at least one void 318 configured to comprise the at least one electromagnetic emitter module 122 may be round, rectangular, or a more complex (composite shape), and may comprise a lateral width of less than 100 mm (or less than 50 mm, less than 40 mm, less than 30 mm or less than 20 mm). For example, the liquid-dispensing system may comprise two or more nozzles and a housing comprising a second sub structure comprising two or more voids for two or more electromagnetic emitter modules. A first distance between center points of the two or more nozzles may be substantially equal (e.g. ±10%) to a second distance between center points of the two or more voids, for example. The first distance and the second distance may be larger than 5 mm (or larger than 8 mm, larger than 10 mm, larger than 20 mm) and/or smaller than 100 mm (smaller than 80 mm, smaller than 50 mm, smaller than 25 mm).

Figure 3G:
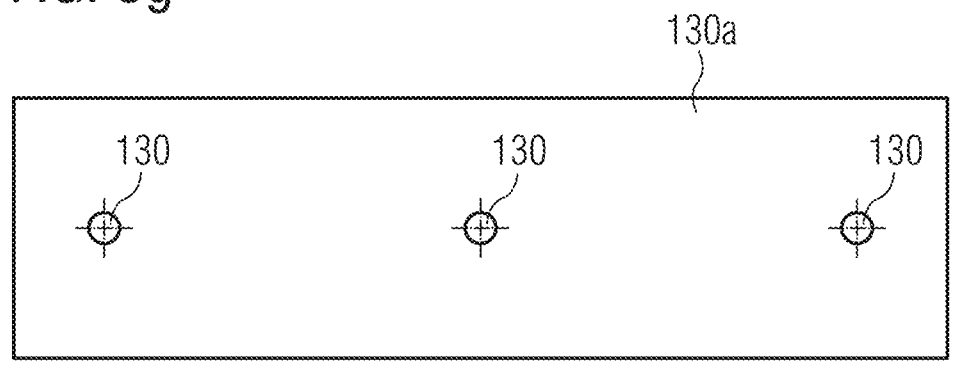
FIG. 3g shows a schematic cross section of an aperture comprising three pinholes.
Figure 3G:
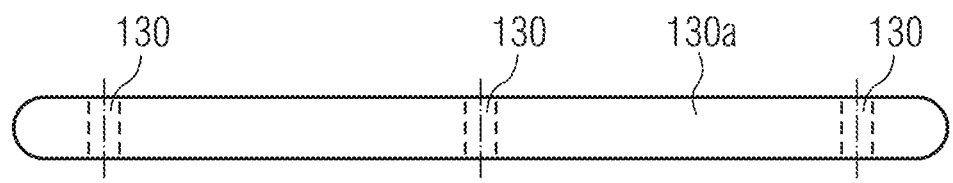
Figure 3G:
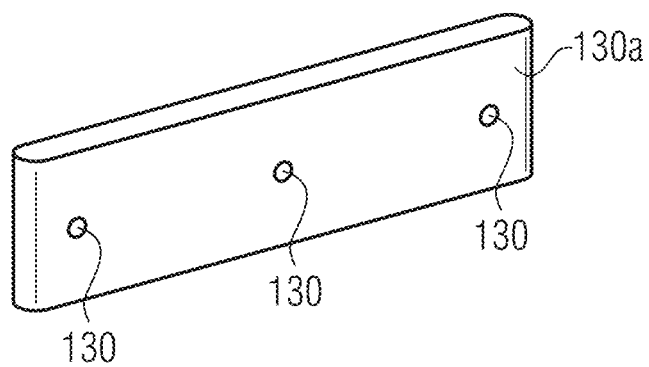

FIG. 3g illustrates schematic diagrams of an embodiment of the aperture structure 130a comprising the at least one aperture 130. FIG. 3f comprises a schematic side view, a schematic cross section and a schematic 3D view of the aperture structure 130a. The aperture structure 130a may comprise a lateral width of less than 10 mm (or less than 5 mm, less than 4 mm, less than 3 mm or less than 2 mm), for example. For example, the aperture structure 130a may comprise two or more apertures. A distance between center points of the two or more apertures may be substantially equal (e.g. ±10%) to a first and second distance described in connection with FIG. 3f.

For example, a lateral length of an object may be the largest lateral extension of the object. A vertical height of the object may be the largest vertical extension of the object. A lateral width of the object may be the lateral extension of the object orthogonal to the largest lateral extension of the object.

Figure 3H:
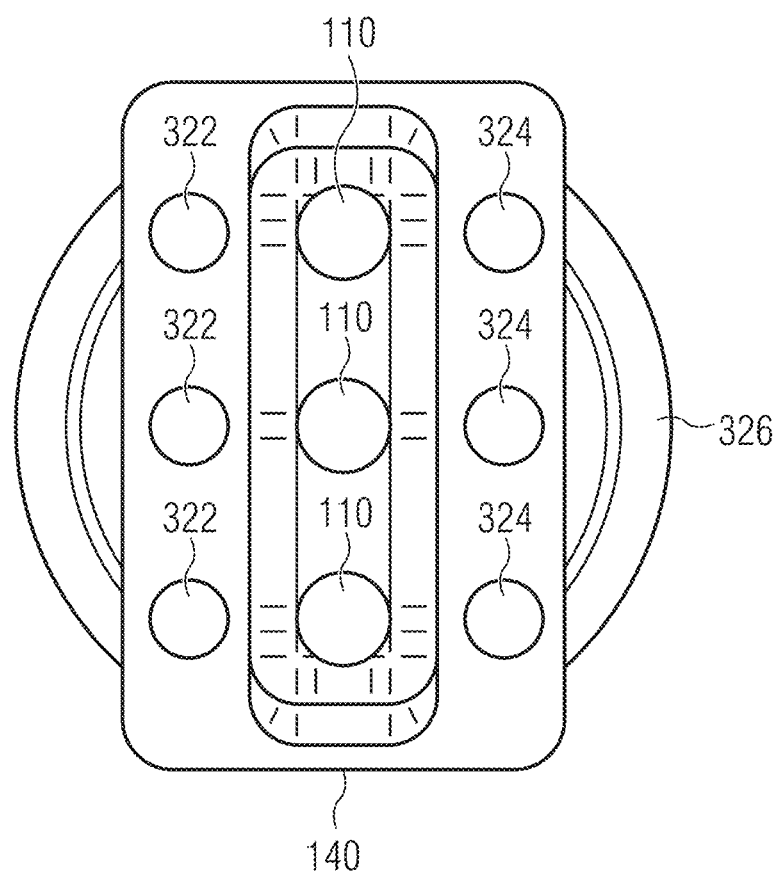
FIGS. 3h-3i show schematic illustrations of housings for a liquid-dispensing system.

FIG. 3h illustrates a schematic diagram of an embodiment of a housing 140. The housing comprises holes (voids) 322; 324 for the at least one sensor module 120 and the at least one electromagnetic emitter module 122. The housing 140 may be clamped to a sub-structure 326 of the liquid-dispensing system comprising the at least one nozzle 110.

Figure 3I:
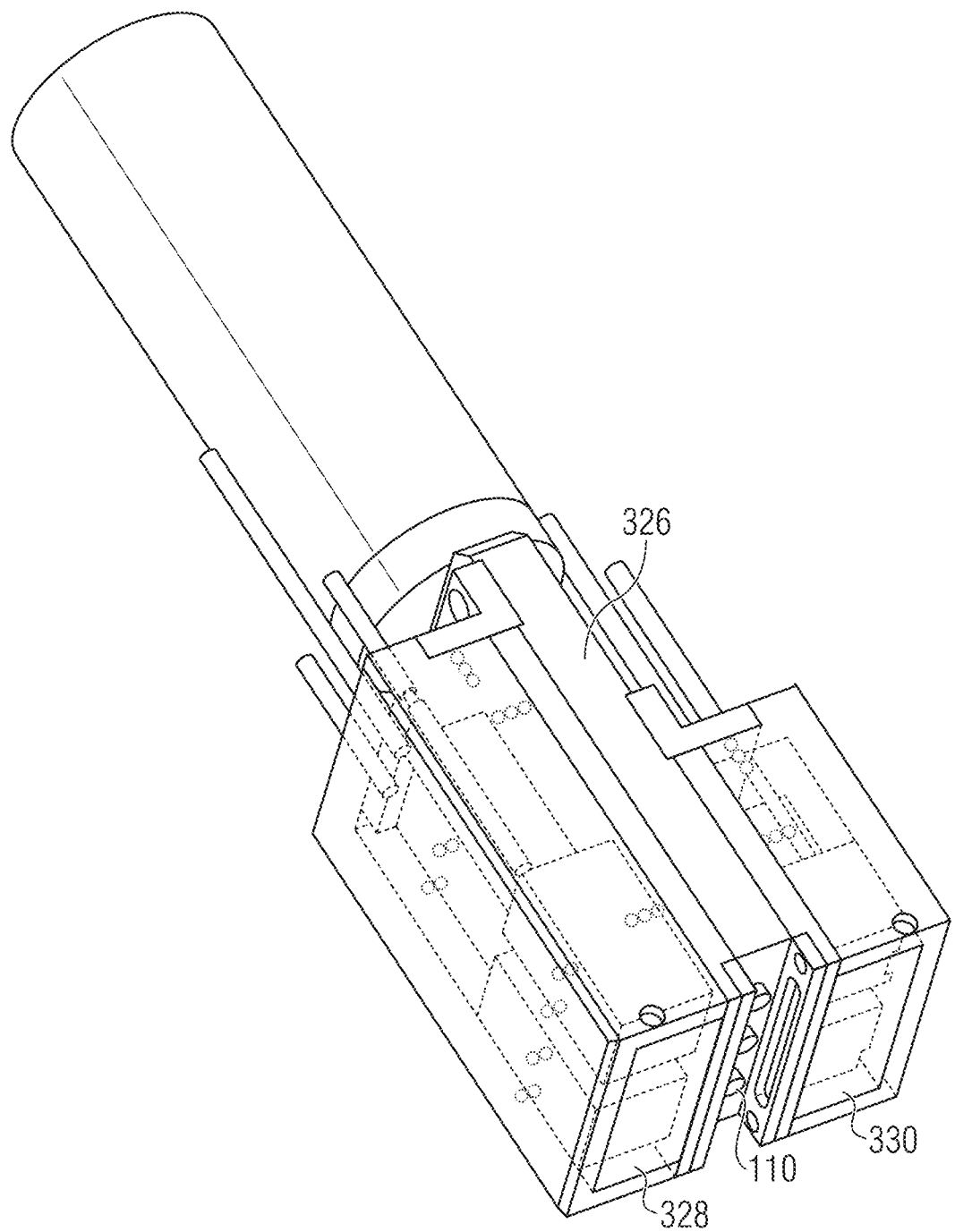

FIG. 3i illustrates a schematic diagram of another embodiment of a liquid-dispensing system comprising a housing. A media dispenser including all three sensors with chemically resistant housing may look like FIG. 3i. The housing comprises sub structures 328; 330 for the at least one sensor module 120 and the at least one electromagnetic emitter module 122. The housing 140 may be mounted to a sub-structure 326 of the liquid-dispensing system comprising the at least one nozzle 110.

More details and aspects of the liquid-dispensing system 300 are mentioned in connection with the proposed concept or one or more examples described above or below (e.g. FIG. 1-2a, FIG. 4-5). The liquid-dispensing system 300 may comprise one or more additional optional features corresponding to one or more aspects of the proposed concept or one or more examples described above or below.

Figure 4:
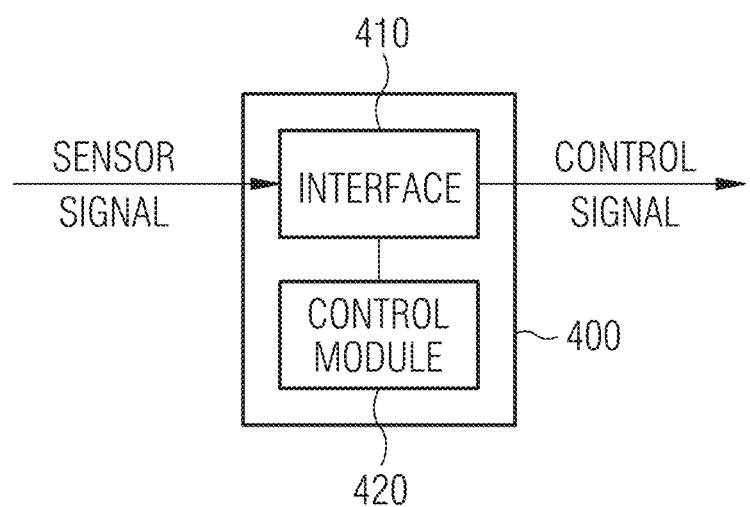
FIG. 4 illustrates a block diagram of an apparatus for providing a control signal for a liquid-dispensing system.

FIG. 4 illustrates a block diagram of an apparatus 400 for providing a control signal for a liquid-dispensing system. The apparatus comprises at least one interface 410 configured to obtain a sensor signal comprising information related to whether a liquid is dispensed by a nozzle of the liquid-dispensing system. The apparatus further comprises a control module 420 configured to detect an erroneous dispensing of liquid by the nozzle based on the sensor signal. The at least one interface 410 is configured to provide a control signal based on a detected erroneous dispensing of liquid by the nozzle. For example, the at least one interface 410 may be configured to obtain a status signal comprising information related to an activation of the nozzle of the liquid-dispensing system (e.g. from the liquid-dispensing system).

The apparatus may be configured to detect dripping of liquids from deactivated nozzles, which may enable detecting errors in a production process (e.g. in a wafer production process) during manufacturing. If the dripping is detected early on, appropriate steps may be taken to avoid contamination of additional processing materials. Furthermore, the sensor signal may be used to monitor a flow of the liquid, e.g. to detect a positive or negative deviance from a planned amount (e.g. duration or volume) of liquid to be dispensed.

The erroneous dispensing of liquid by the nozzle may correspond to one of dripping of the nozzle, dispensing of liquid if the nozzle is deactivated, or dispensing an amount of liquid, the amount being below a (lower) quantity threshold or above an (upper) quantity threshold, for example.

For example, the control module 420 may be further configured to detect whether liquid is dispensed by the nozzle, based on the sensor signal. The control module 420 may be further configured to determine information related to a mismatch between whether the liquid is dispensed by the nozzle and the information related to the activation of the nozzle. The information related to the activation of the nozzle may indicate if the nozzle (or a media valve coupled to the nozzle) is switched on or off. For example, the information related to the activation of the nozzle may indicate an activation/deactivation or open/closed state of a liquid dispense valve for the nozzle. The control module 420 may be configured to detect erroneous dispensing of liquid by the nozzle based on the information related to the mismatch (e.g. if a mismatch exists between whether the liquid is dispensed and an activation of the nozzle).

For example, the control module 420 may be configured to detect a spike (e.g. a temporary variation within at least a sub-component of the sensor signal of at least 10% (or at least 20%, or at least 50%) from an average value of the sub-component) within the sensor signal to detect whether liquid is dispensed by the nozzle, e.g. to detect an erroneous dispensing of liquid by the nozzle (e.g. dripping of the nozzle). For example, the apparatus 400 may comprise a data structure comprising one or more reference values for the sensor signal or sub-components of the sensor signal. The control module 420 may be further configured to obtain the one or more reference values via the interface 410, for example. Alternatively, the control module 420 may be configured to determine the one or more reference values, e.g. during a calibration phase. The control module 420 may be configured to detect whether the liquid is (erroneously) dispensed based on a comparison between the sensor signal or sub-components of the sensor signal and the reference values. For example, the reference values may comprise information related to an (average, maximum or minimum) value (e.g. energy, current, voltage, intensity) measured by a sensor comprising the sensor signal if liquid is dispensed by the nozzle and/or information related to an (average, maximum or minimum) value measured by the sensor if no liquid is dispensed, and the control module 420 may be configured to compare the reference values to a current corresponding value comprised in the sensor signal to detect whether liquid is (erroneously) dispensed.

For example, the sensor signal may comprise information related to electromagnetic radiation measured by a sensor module. The control module 420 may be configured to compare a radiation intensity level of the electromagnetic radiation measured by the at least one sensor module to an intensity threshold to detect whether the liquid is (erroneously) dispensed by the nozzle. Using the information related to the electromagnetic radiation may enable detecting whether the liquid is dispensed by enabling a measurement of the influence of liquid on the electromagnetic radiation by the at least one sensor module, e.g. a refraction or absorption of the electromagnetic radiation by the liquid. For example, the one or more reference values may comprise information related to the intensity threshold, e.g. in Joule or watt. For example, the information related to the electromagnetic radiation may comprise information related to a current or voltage caused by measuring an intensity of the electromagnetic radiation, and the intensity threshold may comprise information related to a reference current or reference voltage for comparison. For example, the control module 420 may be configured to determine information related to the intensity threshold (for an energy level of an electromagnetic radiation measured by the at least one sensor module) based on a previous sensor signal. The previous sensor signal may correspond to a state or information comprised in the sensor signal measured at a previous point in time. For example, the control module 420 may be configured to determine an average energy level for an activation and/or a deactivation of the nozzle based on the previous sensor signal, and to determine the intensity threshold based on the average energy level, e.g. allowing a deviation of up to 50% (or up to 25%, up to 20% or up to 10%).

For example, the sensor signal may comprise information related to an influence of liquid on eddy currents induced by a sensor module. The control module 420 may be configured to detect whether liquid is (erroneously) dispensed based on the influence of the liquid on the eddy currents. Using eddy currents to detect whether the liquid is dispensed may enable inductive measuring of the dispensing of the liquid. For example, the information related to an influence of the liquid on eddy currents induced by a sensor module may comprise information related to a current flowing through an induction loop. The control module 420 may be configured to detect whether the liquid is (erroneously) dispensed based on the information related to the current flowing through the induction loop. For example, the control module 420 may be configured to detect whether the liquid is (erroneously) dispensed (e.g. dripping of at least one nozzle) if the current increases more than 10% (or more than 20% or more than 50%) compared to a current flowing through the induction loop when no liquid is dispensed. For example, the control module 420 may be configured to determine an amount of liquid dispensed based on a (linear) relationship between the current and the amount of liquid dispensed, e.g. based on information related to the (linear) relationship comprised in the one or more reference values.

For example, the information related to the mismatch may indicate, whether there is a mismatch or a match between the liquid dispensed (or not dispensed) and the information related to the activation of the nozzle. For example, the control module 420 may be configured to determine a mismatch (e.g. detect erroneous dispensing of liquid) for the information related to the mismatch if the liquid is dispensed and the information related to the activation of the nozzle indicates that the nozzle is deactivated. For example, the control module 420 may be configured to determine a mismatch (e.g. detect erroneous dispensing of liquid) for the information related to the mismatch if the liquid is not dispensed and the information related to the activation of the nozzle indicates that the nozzle is activated, or if an amount of liquid dispensed is below a quantity threshold and the information related to the activation of the nozzle indicates that the nozzle is activated. For example, the control module 420 may be configured to determine a match for the information related to the mismatch if the liquid is not dispensed and the information related to the activation of the nozzle indicates that the nozzle is deactivated or if the amount of liquid is dispensed (e.g. amount of liquid is above the quantity threshold) and the information related to the activation of the nozzle indicates that the nozzle is activated. For example, the control module 420 may be configured to provide the control signal to affect a stop of the liquid dispensing system if the information related to the mismatch indicates a mismatch.

For example, the control module 420 may be configured to provide the control signal to trigger at least one of a warning (e.g. a warning message in display of a device comprising the apparatus 400 or a log entry) or a stop of the liquid dispensing system if the sensor signal indicates that liquid is erroneously dispensed, e.g. if the sensor signal indicates that liquid is dispensed and the information related to the activation of the nozzle indicates that the nozzle is deactivated. Stopping the liquid-dispensing system and/or a chemical or chemo-mechanical plant if liquid is dispensed while the nozzle is deactivated may limit consequences being caused by the dripping to a current unit being processed. For example, the control signal may comprise a voltage or digital bit value indicating the liquid-dispensing system to stop dispensing of the liquid. For example, the control module 420 may be configured to provide the control signal to a chemical or chemo-mechanical processing plant (e.g. a wafer fabrication plant) to affect a stop or alert in the chemical or chemo-mechanical processing plant. For example, the chemical or chemo-mechanical processing plant (or a part thereof, e.g. a liquid-dispensing system as discussed in FIGS. 1-3) may be configured to stop operation or dispensing of liquid based on the control signal.

For example, the control module 420 may be configured to determine an amount of liquid dispensed by the nozzle (e.g. a time period, over which the liquid is dispensed or a volume of the liquid dispensed) based on the sensor signal. For example, the amount of liquid (to be dispensed) may relate to a time period, over which the liquid is dispensed, and/or to a volume of liquid dispensed per time unit. The control module 420 may be configured to provide the control signal to trigger at least one of a warning or affect a stop of the liquid dispensing system (or chemical or chemo-mechanical processing plant) if information related to an activation of the nozzle indicates that the nozzle is activated and the amount of liquid dispensed is below a quantity threshold (e.g. a time threshold or a volume threshold). Stopping the liquid-dispensing system and/or a chemical or chemo-mechanical plant if the amount of liquid dispensed is below a threshold may help avoid production errors caused by too little liquid being dispensed and may help detect sensor defects. For example, the one or more reference values may comprise information related to the quantity threshold. For example, the quantity threshold may be more than 10% smaller (or more than 20% smaller, more than 50% smaller) than an average amount of liquid dispensed. For example, the control module 420 may be configured to determine the amount of liquid dispensed based on a (linear) relationship between the sensor signal or a component of the sensor signal and the amount of liquid dispensed. The one or more reference values may comprise information related to the (linear) relationship, e.g. as formula or look-up table. For example, the sensor signal mal comprise information related to a current or voltage produced by a sensor module as information related to electromagnetic radiation measured by the at least one sensor module. The control module 420 may be configured to determine the amount of liquid dispensed based on a (linear) relationship between the current or voltage and the amount of liquid dispensed, e.g. based on a transformation formula or based on a look-up table.

For example, the control module 420 may be configured to determine information related to the quantity threshold (for an amount of liquid dispensed) based on a previous sensor signal. For example, the control module 420 may be configured to determine an average amount of liquid dispensed for an activation of the nozzle based on the previous sensor signal, and to determine the quantity threshold based on the average amount of liquid dispensed, e.g. allowing a deviation of up to 50% (or up to 25%, up to 20% or up to 10%). For example, the control module 420 may be configured to determine the quantity threshold between a first value of the previous sensor signal when the at least one nozzle is deactivated and a second value of the previous sensor signal when the at least one nozzle is activated. For example, the quantity threshold (for the information related to the quantity threshold) may be at least 10% (or at least 20%) higher (or lower) than the first value and at least 10% (or at least 20%) lower (or higher) than the second value.

For example, the control module may be configured to provide self-monitoring control of the sensor's threshold using analog values of intensity—for significant differences between the sensor's on/off levels the threshold may be calculated to be in-between the on and the off level, which may lead to a higher sensor stability.

The at least one interface 410 may correspond to one or more inputs and/or outputs for receiving and/or transmitting information, which may be in digital (bit) values according to a specified code, within a module, between modules or between modules of different entities. The at least one interface 410 may comprise or correspond to an interface for external communication. The at least one interface 410 may comprise direct IO (Input Output) for equipment interaction (Media on/off valves, Process Abort, etc.) and/or external communication for monitoring and process control (e.g. APC, Advanced Process Control).

In embodiments the control module 420 may be implemented using one or more processing units, one or more processing devices, any means for processing, such as a processor, a computer or a programmable hardware component being operable with accordingly adapted software. In other words, the described function of the control module 420 may as well be implemented in software, which is then executed on one or more programmable hardware components. Such hardware components may comprise a general purpose processor, a Digital Signal Processor (DSP), a micro-controller, etc.

More details and aspects of the apparatus 400 are mentioned in connection with the proposed concept or one or more examples described above or below (e.g. FIGS. 1 to 3i, 4a-5). The apparatus 400 may comprise one or more additional optional features corresponding to one or more aspects of the proposed concept or one or more examples described above or below.

FIG. 4a illustrates a block diagram of an embodiment of an apparatus 400a for providing a control signal for a liquid-dispensing system. The apparatus 400a may be implemented similar to the apparatus described in connection with FIG. 4. The apparatus 400a may be configured to obtain 404 information related to a detected light intensity (e.g. in a sensor signal) from a detection head 402 (e.g. a sensor module 120 as described in connection with FIGS. 1-3). The apparatus may be further configured to obtain 408 information related to an activation of a media valve (e.g. an activation of a nozzle for dispensing liquid) from a spin-etch tool 406 (which may comprise a liquid-dispensing system). The apparatus 400a (e.g. an SPS (Speicherprogrammierbare Steuerung, memory-programmable control) system) may be configured to determine a mismatch between the information related to the activation and the detected light intensity. Is the detected light intensity high and the medium activated, everything may be working well and no tool stop may be necessary. Is the detected light intensity low and the medium activated, the apparatus 400a may be configured to detect an error, e.g. due to a media interruption and may provide a control signal 410 to affect a stop of the spin etch tool. Is the detected light intensity low and the medium deactivated, everything may be working well and no tool stop may be necessary. Is the detected light intensity high and the medium deactivated, a dripping of the medium (e.g. liquid) may be detected, and the apparatus 400a may be configured to provide a control signal 410 to affect a stop of the spin etch tool 406, for example. Furthermore, the apparatus 400a may be configured to provide 414 information related to a status of the apparatus to an external evaluation module 412, e.g. for monitoring or controlling of a chemical power plant, e.g. via an Advanced Process Control (APC) tool.

More details and aspects of the apparatus 400a are mentioned in connection with the proposed concept or one or more examples described above or below (e.g. FIGS. 1 to 4, 5). The apparatus 400a may comprise one or more additional optional features corresponding to one or more aspects of the proposed concept or one or more examples described above or below.

Figure 5:
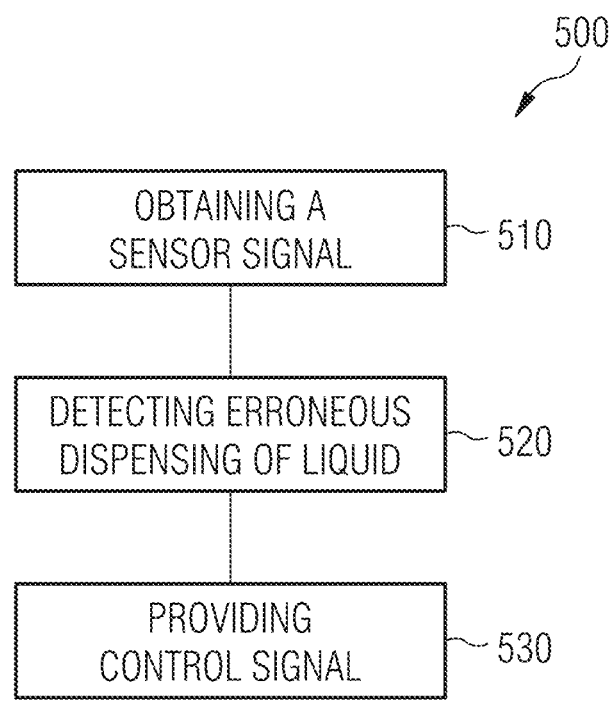
FIG. 5 illustrates a flow chart of a method for providing a control signal for a liquid-dispensing system.

FIG. 5 illustrates a flow chart of a method 500 for providing a control signal for a liquid-dispensing system. The method comprises receiving 510 a sensor signal comprising information related to whether a liquid is dispensed by a nozzle of the liquid-dispensing system. The method further comprises detecting 520 an erroneous dispensing of liquid by the nozzle based on the sensor signal. The method further comprises providing 530 a control signal based on a detected erroneous dispensing of liquid by the nozzle.

For example, the detecting 520 of erroneous dispensing of liquid may comprise detecting 520 whether liquid is dispensed by the nozzle, based on the sensor signal and determining information related to a mismatch between whether the liquid is dispensed by the nozzle and information related to an activation of the nozzle. A mismatch may correspond to an erroneous dispensing of liquid.

For example, the method 500 may further comprise obtaining a status signal comprising information related to an activation of the nozzle of the liquid-dispensing system (e.g. from the liquid-dispensing system). The detecting 520 of the erroneous dispensing of the liquid by the nozzle may further be based on the information related to the activation of the nozzle.

The method may allow to detect dripping of liquids from deactivated nozzles, which may enable detecting errors in a production process (e.g. in a wafer production process) during manufacturing. If the dripping is detected early on, appropriate steps may be taken to avoid contamination of additional processing materials. Furthermore, the sensor signal may be used to monitor a flow of the liquid, e.g. to detect a positive or negative deviance from a planned amount (e.g. duration or volume) of liquid to be dispensed.

More details and aspects of the method 500 are mentioned in connection with the proposed concept or one or more examples described above or below (e.g. FIGS. 1 to 4a). The method 500 may comprise one or more additional optional features corresponding to one or more aspects of the proposed concept or one or more examples described above or below.

Spin etch processes may for example be used to remove certain physical layers (e.g. an oxide) from a wafer, or to remove crystal damage after grinding. Depending on the layer to be removed, different chemical media (e.g. liquids) may be spun off the wafer. Sometimes, a combination of chemicals (one after the other, e) may be necessary to obtain the desired results.

A media-dispense arm (e.g. comprising one or more nozzles of a liquid-dispensing system) may move across the wafer diameter dispensing medium 1, 2 or 3 (which may be different media/liquids). Usually, only one medium (e.g. liquid) might be used at a time. The sequence could be as follows: The $1^{st}$ medium may be switched off after a defined amount of time and the remaining medium may be spun off the wafer before the $2^{nd}$ medium is switched on. Occasionally, dripping of the medium 1 may occur during the process of medium 2 or even after the etching is done. Unwanted dispense of medium (e.g. dripping) may often cause wafer loss, which might not be detected during the process. In some cases, between 20% and 50% of all lost wafers may be attributed to dripping of the media dispense booms. Strong efforts may be made to prevent the media dispenser from dripping and to detect dripping. Other systems might not significantly reduce the wafer loss caused by dripping and might not comprise an appropriate dripping detection module. Such a module (e.g. of embodiments) may detect dripping during process, giving the possibility to intervene.

Embodiments may provide a dripping sensor for spin-etch processes. At least some embodiments may be based on using a laser light sheet combined with a detector for each medium to detect dripping when the medium should be switched off.

Other systems might not provide reliable technology to prevent the dispenser from dripping or might not provide a module which detects dripping reliably. Dripping of the media dispenser may usually cause wafer loss and might not be detected during process. For example, the whole batch or more batches (of wafers) might be affected.

In an embodiment, a liquid dispensing system may comprise three nozzles for three chemicals of a media dispenser. Only one medium might be dispensed at a time. Unwanted dripping of another medium may lead to wafer loss. At least some embodiments may be based on a detection of liquid.

Embodiments may use three optical light sheets (laser curtains, one sensor for each medium). A laser curtain may comprise a sender and a detector. The sender may emit laser radiation in shape of a light sheet with a width comparable to the width of one medium dispense nozzle. The light may be transmitted below the nozzle to the detector (e.g. of a sensor module), which may be configured to convert the light intensity to a computable signal. Whenever something (like a drop of chemical) is passing through the light sheet (e.g. on a well defined optical path), the detector may be configured to deliver the corresponding signal to its output. Embodiments might not be restricted to the use of a specific sensor. For example, all kinds of optical (or electromagnetic radiation) detectors might be used.

For example, the detection head may be to be insensitive to misalignment and may enable a reliable and stable detection of media on/off. For example, the liquid-dispensing system may be insensitive to mechanical deviations. For example, the medium (liquid) may change its color and absorption behavior over time. Embodiments may suppress an influence from changing absorption (behavior) of media. For example, at least some embodiments may be based on diffraction, absorption or refraction. For example, embodiments may provide self adjustment of media on/off thresholds.

One of these sensors may be used for each medium, e.g. three sensors may be required for three media. This may enable independent detection of dripping of the three media. The housing of the sensors may be chemically resistant, for example.

The sensors are read out by a SPS (Speicher-Programmierbare Steuerung, memory-programmable controller). The SPS may record the inputs of the sensors and the signals of the tool (whether a medium is currently switched on or off). The SPS software (e.g. an in-house development) may compute the input signals and send an error signal to the Spin-Etch tool when necessary. The Spin-Etch tool may, in case of an error message from the SPS, stop the process after the currently processed wafer and show an error message.

Intervention may be triggered right after a single wafer is affected, reducing the number of wafer loss dramatically. In other systems, a whole batch of wafers or more batches may be affected before dripping of the media dispenser is detected.

Example embodiments may further provide a computer program having a program code for performing one of the above methods, when the computer program is executed on a computer or processor. A person of skill in the art would readily recognize that acts of various above-described methods may be performed by programmed computers. Herein, some example embodiments are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further example embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A liquid-dispensing system comprising:
    a nozzle configured to dispense a liquid;
    a sensor configured to provide a sensor signal comprising information related to whether liquid is dispensed by the nozzle, wherein a part of the sensor is located in proximity of the nozzle;
    an electromagnetic emitter configured to emit electromagnetic radiation towards a path of falling of liquid dispensed by the nozzle, wherein the sensor is configured to provide the sensor signal based on an influence of dispensed liquid on the electromagnetic radiation;
    an aperture structure comprising an aperture disposed between the nozzle and the sensor, wherein the aperture is configured to define an angle beam of electromagnetic radiation emitted by the electromagnetic emitter towards the path of the falling of the liquid, and the sensor and the electromagnetic emitter are disposed on opposite sides of the aperture; and
    a housing comprising:
        a first sub-structure having a cavity extending from a top surface of the housing to a bottom surface of the housing, wherein at least a portion of the nozzle is disposed within the cavity,
        a second sub-structure comprising the sensor attached to the bottom surface of the housing, and
        a third sub-structure comprising the aperture structure disposed within at least a portion of a cavity of the second sub-structure.

2. The liquid-dispensing system according to claim 1, wherein the aperture comprises at least one pinhole or at least one slit configured to define the angle beam.

3. The liquid-dispensing system according to claim 1, wherein the sensor comprises an optical sensor configured to generate the sensor signal based on light received after interacting with the liquid dispensed by the nozzle.

4. The liquid-dispensing system according to claim 1, the aperture structure is further configured to shield the sensor from a part of the electromagnetic radiation emitted by the electromagnetic emitter.

5. The liquid-dispensing system according to claim 4, wherein a lateral distance between the aperture structure and the dispensed liquid is less than 2 cm.

6. The liquid-dispensing system according to claim 4, wherein the aperture comprises a minimal width of less than 10 mm and more than 0.4 mm.

7. The liquid-dispensing system according to claim 1, wherein the sensor is configured to determine the sensor signal based on a refraction of the emitted electromagnetic radiation caused by the dispensed liquid.

8. The liquid-dispensing system according to claim 1, wherein the electromagnetic emitter is configured to emit light having a wavelength between 100 nm and 100 µm.

9. The liquid-dispensing system according to claim 1, wherein the electromagnetic emitter is configured to emit the electromagnetic radiation at a wavelength, at which more than 30% of a portion of the electromagnetic radiation hitting liquid dispensed by the nozzle passes the liquid dispensed by the nozzle.

10. The liquid-dispensing system according to claim 1, wherein a portion of the electromagnetic radiation emitted by the electromagnetic emitter received by the sensor while the liquid is dispensed by the nozzle is at least 10% higher or lower than a portion of the electromagnetic radiation emitted by the electromagnetic emitter received by the sensor while no liquid is dispensed by the nozzle.

11. The liquid-dispensing system according to claim 1, wherein the nozzle comprises a nozzle tip that defines a fluid exiting end configured to dispense the liquid, and wherein the nozzle is configured to dispense the liquid on a surface of a semiconductor wafer in a form of a droplet or a stream during processing of the semiconductor wafer.

12. The liquid-dispensing system according to claim 1, wherein the nozzle comprises a plurality of nozzles, the sensor comprises a plurality of sensors corresponding to the plurality of nozzles.

13. The liquid-dispensing system according to claim 1, wherein a lateral distance between the sensor and the liquid dispensed by the nozzle is less than 5 cm.

14. The liquid-dispensing system according to claim 1, wherein the housing is chemically resistant against sulfuric acid, nitric acid, or hydrofluoric acid.

15. The liquid-dispensing system according to claim 14, wherein a part of the housing located between the electromagnetic emitter or the sensor and a path of falling of the dispensed liquid comprises a semi-transparent material.

16. A semiconductor liquid-dispensing system comprising:
a plurality of nozzles physically connected to a housing, wherein each nozzle of the plurality of nozzles comprises a nozzle tip that defines a fluid exiting end configured to dispense a corresponding liquid, and wherein the plurality of nozzles are configured to dispense the corresponding liquid on a surface of a semiconductor wafer in a form of a droplet or a stream during processing of the semiconductor wafer; and
a plurality of sensors corresponding to the plurality of nozzles and physically connected to the housing, wherein each sensor of the plurality of sensors is configured to provide a corresponding sensor signal comprising information related to whether the corresponding liquid is dispensed at its corresponding nozzle of the plurality of nozzles, and wherein the plurality of sensors is located in proximity of the plurality of nozzles; and
an aperture structure physically connected to the housing, wherein the aperture structure comprises a plurality of pinholes or slits disposed between the plurality of nozzles and the plurality of sensors;
a plurality of electromagnetic emitters configured to emit electromagnetic radiation towards respective paths of falling liquid dispensed by respective nozzles of the plurality of nozzles, wherein each sensor of the plurality of sensors is configured to provide the corresponding sensor signal based on an influence of dispensed liquid on the electromagnetic radiation, each of the plurality of pinholes or slits is configured to define an angle beam of electromagnetic radiation emitted by a respective electromagnetic emitter of the plurality of electromagnetic emitters towards each respective path of the falling of the liquid, and each sensor of the plurality of sensors is located on an opposite side of the plurality of the plurality of pinholes or slits from the plurality of electromagnetic emitters; and
the housing comprising:
a first sub-structure having a cavity extending from a top surface of the housing to a bottom surface of the housing, wherein at least a portion of the plurality of nozzles is disposed within the cavity,
a second sub-structure comprising the plurality of sensors attached to the bottom surface of the housing, and
a third sub-structure comprising the aperture structure disposed within at least a portion of a cavity of the second sub-structure.

17. The semiconductor liquid-dispensing system according to claim 16, wherein each sensor comprises an optical sensor configured to generate the corresponding sensor signal based on light received after interacting with liquid dispensed by its corresponding nozzle.

18. The semiconductor liquid-dispensing system according to claim 16, wherein the aperture structure is configured to shield each sensor from a part of the electromagnetic radiation emitted by the plurality of electromagnetic emitters.

19. The semiconductor liquid-dispensing system according to claim 16, wherein each sensor is configured to determine the corresponding sensor signal based on a refraction of the emitted electromagnetic radiation caused by the dispensed liquid.

20. A method of operating a semiconductor liquid-dispensing system comprising a nozzle, a sensor configured to provide a sensor signal comprising information related to whether liquid is dispensed by the nozzle, wherein a part of the sensor is located in proximity of the nozzle, an electromagnetic emitter configured to emit electromagnetic radiation towards a path of falling of liquid dispensed by the nozzle, wherein the sensor is configured to provide the sensor signal based on an influence of dispensed liquid on the electromagnetic radiation, and, an aperture structure comprising an aperture disposed between the nozzle and the sensor, wherein the aperture is configured to define an angle beam of electromagnetic radiation emitted by the electromagnetic emitter towards the path of the falling of the liquid, and the sensor and the electromagnetic emitter are disposed on opposite sides of the aperture, and a housing comprising a first sub-structure having a cavity extending from a top surface of the housing to a bottom surface of the housing, wherein at least a portion of the nozzle is disposed within the cavity, a second sub-structure comprising the sensor attached to the bottom surface of the housing, and a third sub-structure comprising the aperture structure disposed within at least a portion of a cavity of the second sub-structure, the method comprising:
dispensing a liquid from the nozzle;
sensing the dispensed liquid using the sensor; and
generating the sensor signal at the sensor based on the sensing.

* * * * *